United States Patent

Butler et al.

[11] Patent Number: 5,838,296
[45] Date of Patent: Nov. 17, 1998

[54] APPARATUS FOR CHANGING THE MAGNIFICATION OF VIDEO GRAPHICS PRIOR TO DISPLAY THEREFOR ON A TV SCREEN

[75] Inventors: Donald S. Butler; Richard S. Amano, both of Scottsdale, Ariz.

[73] Assignee: General Instrument Corporation, Horsham, Pa.

[21] Appl. No.: 523,789

[22] Filed: Aug. 31, 1995

[51] Int. Cl.$^6$ ........................................ G09G 5/00
[52] U.S. Cl. ................................ 345/127; 345/131
[58] Field of Search .................... 345/127, 128, 345/129, 130, 131, 132, 133; 348/561, 581, 913, 556; 382/298, 299; 395/139

[56] References Cited

U.S. PATENT DOCUMENTS

| | | | |
|---|---|---|---|
| 4,420,770 | 12/1983 | Rahman | 358/183 |
| 4,580,165 | 4/1986 | Patton et al. | 358/148 |
| 4,737,772 | 4/1988 | Nishi et al. | 340/703 |
| 4,754,270 | 6/1988 | Murauchi | 340/731 |
| 4,757,384 | 7/1988 | Nonweiler et al. | 348/581 |
| 4,791,491 | 12/1988 | Minowa | 358/284 |
| 4,876,600 | 10/1989 | Pietzsch et al. | 358/183 |
| 4,893,258 | 1/1990 | Sakuragi | 364/521 |
| 4,907,284 | 3/1990 | Ohuchi | 345/131 |
| 4,951,038 | 8/1990 | Yamamura | 340/725 |
| 4,965,670 | 10/1990 | Klinefelter | 358/183 |
| 5,027,212 | 6/1991 | Marlton | 358/183 |
| 5,056,143 | 10/1991 | Greaves et al. | 340/701 |
| 5,065,231 | 11/1991 | Greaves et al. | 358/22 |
| 5,179,642 | 1/1993 | Komatsu | 395/135 |
| 5,185,597 | 2/1993 | Pappas et al. | 340/709 |
| 5,235,677 | 8/1993 | Needle et al. | 395/131 |
| 5,258,826 | 11/1993 | Wakeland et al. | 358/12 |
| 5,258,843 | 11/1993 | Truong | 358/183 |
| 5,313,231 | 5/1994 | Yin et al. | 345/199 |
| 5,323,173 | 6/1994 | Sakuma et al. | 345/131 |
| 5,355,175 | 10/1994 | Okada et al. | 348/595 |
| 5,357,286 | 10/1994 | Hwang | 348/589 |
| 5,389,947 | 2/1995 | Wood et al. | 345/145 |
| 5,396,298 | 3/1995 | Hosokawa et al. | 348/581 |

FOREIGN PATENT DOCUMENTS

| | | |
|---|---|---|
| 0016299 | 10/1980 | European Pat. Off. . |
| 0179204 | 4/1986 | European Pat. Off. . |
| 0179205 | 4/1986 | European Pat. Off. . |
| 0200283 | 11/1986 | European Pat. Off. . |
| 0248235 | 12/1987 | European Pat. Off. . |

Primary Examiner—Chanh Nguyen
Attorney, Agent, or Firm—Volpe and Koenig, P.C.

[57] ABSTRACT

Video magnification apparatus modifies (shrinks or enlarges) video graphic images in a horizontal and vertical direction during a transfer of video graphics data signals from a graphics memory to a television screen. A first magnification modifying device modifies the magnification of a graphic by a vertical magnification factor by generating graphic line address output signals that selectively prevent a transmission of predetermined horizontal lines of the graphic upon the reception of a vertical magnification factor that is less than unity. The first device also causes a transmission of predetermined horizontal lines of the graphic to be selectively repeated upon the reception of a vertical magnification factor that is greater than unity. A second magnification modifying device is responsive to the transmissions of the horizontal lines of the graphic indicated for transmission by the output signals of the first magnification modifying means for modifying the magnification of the graphic in a horizontal direction by a horizontal magnification factor. The second magnification modifying device selects N predetermined pixels of each received X pixel group that are multiplexed into a transmitting X pixel group for transmission in each output signal of the apparatus for a magnification factor equal to or less than unity. Still further, the second device repeats pixels of each received X pixel group a number of times corresponding to an integer magnification factor that is greater than unity for transmission in each output signal of the apparatus.

18 Claims, 13 Drawing Sheets

FIG. 11

| ROM CODE | CNTR CODE | MUX CONNECTIONS (FROM-TO) | | | | | | | | | | | | | | | | | INPUT CODE | | | | ACTIVE LINE |
|---|---|---|---|---|---|---|---|---|---|---|---|---|---|---|---|---|---|---|---|---|---|---|---|
| | | 0 V | 3 3 | 3 2 | 3 1 | 3 0 | 2 3 | 2 2 | 2 1 | 2 0 | 1 3 | 1 2 | 1 1 | 1 0 | 0 3 | 0 2 | 0 1 | 0 0 | INT | OFFSET | SELECT | CYC | |
| 0000 | 0 | 0 | | | | | | | | | | | | | | | | | 00 | 00 | 0000 | 000 | 0 |
| 0000 | 0 | 0 | | | | | | | | | | | | | | | | | 00 | 00 | 0000 | 001 | 0 |
| 0000 | 0 | 0 | | | | | | | | | | | | | | | | | 00 | 00 | 0000 | 010 | 0 |
| 0000 | 0 | 0 | | | | | | | | | | | | | | | | | 00 | 00 | 0000 | 011 | 0 |
| 0000 | 0 | 0 | | | | | | | | | | | | | | | | | 00 | 00 | 0000 | 100 | 0 |
| 0000 | 0 | 0 | | | | | | | | | | | | | | | | | 00 | 00 | 0000 | 101 | 0 |
| 0000 | 0 | 0 | | | | | | | | | | | | | | | | | 00 | 00 | 0000 | 110 | 0 |
| 0000 | 0 | 0 | | | | | | | | | | | | | | | | | 00 | 00 | 0000 | 111 | 0 |
| 0001 | 1 | 0 | | | | | | | | | | | | | | | | 1 | 00 | 00 | 0001 | 000 | 1 |
| 0000 | 0 | 0 | | | | | | | | | | | | | | | | | 00 | 00 | 0001 | 001 | 0 |
| 0000 | 0 | 0 | | | | | | | | | | | | | | | | | 00 | 00 | 0001 | 010 | 0 |
| 0000 | 0 | 0 | | | | | | | | | | | | | | | | | 00 | 00 | 0001 | 011 | 0 |
| 0000 | 0 | 0 | | | | | | | | | | | | | | | | | 00 | 00 | 0001 | 100 | 0 |
| 0000 | 0 | 0 | | | | | | | | | | | | | | | | | 00 | 00 | 0001 | 101 | 0 |
| 0000 | 0 | 0 | | | | | | | | | | | | | | | | | 00 | 00 | 0001 | 110 | 0 |
| 0000 | 0 | 0 | | | | | | | | | | | | | | | | | 00 | 00 | 0001 | 111 | 0 |
| 0010 | 1 | 0 | | | | | | | | | | | | 1 | | | | | 00 | 00 | 0010 | 000 | 1 |
| 0000 | 0 | 0 | | | | | | | | | | | | | | | | | 00 | 00 | 0010 | 001 | 0 |
| 0000 | 0 | 0 | | | | | | | | | | | | | | | | | 00 | 00 | 0010 | 010 | 0 |
| 0000 | 0 | 0 | | | | | | | | | | | | | | | | | 00 | 00 | 0010 | 011 | 0 |
| 0000 | 0 | 0 | | | | | | | | | | | | | | | | | 00 | 00 | 0010 | 100 | 0 |
| 0000 | 0 | 0 | | | | | | | | | | | | | | | | | 00 | 00 | 0010 | 101 | 0 |
| 0000 | 0 | 0 | | | | | | | | | | | | | | | | | 00 | 00 | 0010 | 110 | 0 |
| 0000 | 0 | 0 | | | | | | | | | | | | | | | | | 00 | 00 | 0010 | 111 | 0 |
| 0021 | 2 | 0 | | | | | | | | 1 | | | | | | | | 1 | 00 | 00 | 0011 | 000 | 1 |
| 0000 | 0 | 0 | | | | | | | | | | | | | | | | | 00 | 00 | 0011 | 001 | 0 |
| 0000 | 0 | 0 | | | | | | | | | | | | | | | | | 00 | 00 | 0011 | 010 | 0 |
| 0000 | 0 | 0 | | | | | | | | | | | | | | | | | 00 | 00 | 0011 | 011 | 0 |
| 0000 | 0 | 0 | | | | | | | | | | | | | | | | | 00 | 00 | 0011 | 100 | 0 |
| 0000 | 0 | 0 | | | | | | | | | | | | | | | | | 00 | 00 | 0011 | 101 | 0 |
| 0000 | 0 | 0 | | | | | | | | | | | | | | | | | 00 | 00 | 0011 | 110 | 0 |
| 0000 | 0 | 0 | | | | | | | | | | | | | | | | | 00 | 00 | 0011 | 111 | 0 |
| 0100 | 1 | 0 | | | | | | | | 1 | | | | | | | | | 00 | 00 | 0100 | 000 | 1 |
| 0000 | 0 | 0 | | | | | | | | | | | | | | | | | 00 | 00 | 0100 | 001 | 0 |
| 0000 | 0 | 0 | | | | | | | | | | | | | | | | | 00 | 00 | 0100 | 010 | 0 |
| 0000 | 0 | 0 | | | | | | | | | | | | | | | | | 00 | 00 | 0100 | 011 | 0 |
| 0000 | 0 | 0 | | | | | | | | | | | | | | | | | 00 | 00 | 0100 | 100 | 0 |
| 0000 | 0 | 0 | | | | | | | | | | | | | | | | | 00 | 00 | 0100 | 101 | 0 |
| 0000 | 0 | 0 | | | | | | | | | | | | | | | | | 00 | 00 | 0100 | 110 | 0 |

FIG. 12

| ROM CODE | CNTR CODE | V | 33 | 32 | 31 | 30 | 23 | 22 | 21 | 20 | 13 | 12 | 11 | 10 | 03 | 02 | 01 | 00 | INT | OFFSET | SELECT | CYC | ACTIVE LINE |
|---|---|---|---|---|---|---|---|---|---|---|---|---|---|---|---|---|---|---|---|---|---|---|---|
| | | | | | | | MUX CONNECTIONS (FROM-TO) | | | | | | | | | | | | INPUT CODE | | | | |
| 000C | 4 | 1 | | | | | | | | | | | | | 1 | 1 | | | 10 | 10 | 1101 | 000 | 1 |
| 0861 | 4 | 1 | | | | | 1 | | | | | 1 | 1 | | | | | 1 | 10 | 10 | 1101 | 001 | 1 |
| C300 | 4 | 1 | 1 | 1 | | | | | 1 | 1 | | | | | | | | | 10 | 10 | 1101 | 010 | 1 |
| 1000 | 3 | 0 | | | | 1 | | | | | | | | | | | | | 10 | 10 | 1101 | 011 | 1 |
| 0000 | 0 | 0 | | | | | | | | | | | | | | | | | 10 | 10 | 1101 | 100 | 0 |
| 0000 | 0 | 0 | | | | | | | | | | | | | | | | | 10 | 10 | 1101 | 101 | 0 |
| 0000 | 0 | 0 | | | | | | | | | | | | | | | | | 10 | 10 | 1101 | 110 | 0 |
| 0000 | 0 | 0 | | | | | | | | | | | | | | | | | 10 | 10 | 1101 | 111 | 0 |
| 000C | 4 | 1 | | | | | | | | | | | | | 1 | 1 | | | 10 | 10 | 1110 | 000 | 1 |
| 0870 | 4 | 1 | | | | | 1 | | | | | 1 | 1 | 1 | | | | | 10 | 10 | 1110 | 001 | 1 |
| C300 | 4 | 1 | 1 | 1 | | | | | 1 | 1 | | | | | | | | | 10 | 10 | 1110 | 010 | 1 |
| 1000 | 3 | 0 | | | | 1 | | | | | | | | | | | | | 10 | 10 | 1110 | 011 | 1 |
| 0000 | 0 | 0 | | | | | | | | | | | | | | | | | 10 | 10 | 1110 | 100 | 0 |
| 0000 | 0 | 0 | | | | | | | | | | | | | | | | | 10 | 10 | 1110 | 101 | 0 |
| 0000 | 0 | 0 | | | | | | | | | | | | | | | | | 10 | 10 | 1110 | 110 | 0 |
| 0000 | 0 | 0 | | | | | | | | | | | | | | | | | 10 | 10 | 1110 | 111 | 0 |
| 000C | 4 | 1 | | | | | | | | | | | | | 1 | 1 | | | 10 | 10 | 1111 | 000 | 1 |
| 00E1 | 4 | 1 | | | | | | | | | 1 | 1 | 1 | | | | | 1 | 10 | 10 | 1111 | 001 | 1 |
| 8700 | 4 | 1 | 1 | | | | | 1 | 1 | 1 | | | | | | | | | 10 | 10 | 1111 | 010 | 1 |
| 3000 | 0 | 0 | | | 1 | 1 | | | | | | | | | | | | | 10 | 10 | 1111 | 011 | 1 |
| 0000 | 0 | 0 | | | | | | | | | | | | | | | | | 10 | 10 | 1111 | 100 | 0 |
| 0000 | 0 | 0 | | | | | | | | | | | | | | | | | 10 | 10 | 1111 | 101 | 0 |
| 0000 | 0 | 0 | | | | | | | | | | | | | | | | | 10 | 10 | 1111 | 110 | 0 |
| 0000 | 0 | 0 | | | | | | | | | | | | | | | | | 10 | 10 | 1111 | 111 | 0 |
| 0008 | 4 | 1 | | | | | | | | | | | | | 1 | | | | 10 | 11 | 0000 | 000 | 1 |
| 0861 | 4 | 1 | | | | | 1 | | | | | 1 | 1 | | | | | 1 | 10 | 11 | 0000 | 001 | 1 |
| 6100 | 0 | 0 | | 1 | 1 | | | | | 1 | | | | | | | | | 10 | 11 | 0000 | 010 | 1 |
| 0000 | 0 | 0 | | | | | | | | | | | | | | | | | 10 | 11 | 0000 | 011 | 0 |
| 0000 | 0 | 0 | | | | | | | | | | | | | | | | | 10 | 11 | 0000 | 100 | 0 |
| 0000 | 0 | 0 | | | | | | | | | | | | | | | | | 10 | 11 | 0000 | 101 | 0 |
| 0000 | 0 | 0 | | | | | | | | | | | | | | | | | 10 | 11 | 0000 | 110 | 0 |
| 0000 | 0 | 0 | | | | | | | | | | | | | | | | | 10 | 11 | 0000 | 111 | 0 |
| 0008 | 4 | 1 | | | | | | | | | | | | | 1 | | | | 10 | 11 | 0001 | 000 | 1 |
| 00C3 | 4 | 1 | | | | | | | | | 1 | 1 | | | | | 1 | 1 | 10 | 11 | 0001 | 001 | 1 |
| C300 | 1 | 0 | 1 | 1 | | | | | 1 | 1 | | | | | | | | | 10 | 11 | 0001 | 010 | 1 |
| 0000 | 0 | 0 | | | | | | | | | | | | | | | | | 10 | 11 | 0001 | 011 | 0 |
| 0000 | 0 | 0 | | | | | | | | | | | | | | | | | 10 | 11 | 0001 | 100 | 0 |
| 0000 | 0 | 0 | | | | | | | | | | | | | | | | | 10 | 11 | 0001 | 101 | 0 |
| 0000 | 0 | 0 | | | | | | | | | | | | | | | | | 10 | 11 | 0001 | 110 | 0 |
| 0000 | 0 | 0 | | | | | | | | | | | | | | | | | 10 | 11 | 0001 | 111 | 0 |
| 0008 | 4 | 1 | | | | | | | | | | | | | 1 | | | | 10 | 11 | 0010 | 000 | 1 |
| 00E1 | 4 | 1 | | | | | | | | | 1 | 1 | 1 | | | | | 1 | 10 | 11 | 0010 | 001 | 1 |
| C300 | 1 | 0 | 1 | 1 | | | | | 1 | 1 | | | | | | | | | 10 | 11 | 0010 | 010 | 1 |

APPARATUS FOR CHANGING THE MAGNIFICATION OF VIDEO GRAPHICS PRIOR TO DISPLAY THEREFOR ON A TV SCREEN

CROSS REFERENCE TO RELATED APPLICATIONS

This invention is related to the following applications all of which are assigned to the assignee of the present invention, have common inventors, and are being filed concurrently: U.S. patent application Ser. No. 08/523,395 (GID872), entitled "Method and Apparatus For Performing Two Dimensional Video Convolving"; U.S. patent application Ser. No. 08/523,396 (GID906), entitled "Apparatus For Processing Mixed YUV And Color Palettized Video Signals"; and U.S. patent application Ser. No. 08/523,394 (GID908), entitled "Apparatus Using Memory Control Tables Related To Video Graphics Processing For TV Receivers".

FIELD OF THE INVENTION

The present invention relates to video magnification apparatus for shrinking or magnifying video graphics during a transfer of the video graphics data signals from a graphics memory to a television screen.

BACKGROUND OF THE INVENTION

Some commercially available computers, particularly personal computers, provide circuitry which permits a merger of a composite video signal (e.g., a National Television Standards Committee signal) with computer generated video graphics display signals, typically red, green, and blue (RGB). More particularly, modern video graphics equipment has the ability to produce backgrounds, characters, symbols, and other pictorial representations and arrangements in operator-selected sizes, shapes, and colors.

U.S. Pat. No. 4,737,772 (Nishi et al.), issued on Apr. 12, 1988, discloses a video display controller comprising a video display processor (VDP), a Central Processing Unit (CPU), a memory, and a Video Random Access Memory (VRAM). The memory stores both programs to be executed by the CPU and various kinds of image data. The VRAM stores image data which the VDP can change and then transfer to the outside for display on a screen of a Cathode Ray Tube (CRT) display. In the VDP, a timing signal generator generates timing signals for correctly scanning elements of the picture to be displayed which are used by a horizontal and a vertical counter and the CRT display to synchronize data processing in an image data processing circuit (IDPC) and correctly display such processed data on the screen of the CRT display. A Video Digitizer samples an externally supplied analog video signal and converts signal levels or amplitudes of the analog video signal into digital data composed of 2 or 4 bits each. The Video Digitizer digitized amplitude output data represents a still image and is supplied to the IDPC. The IDPC selectively stores both the Video Digitizer output data and color codes supplied from the CPU into the VRAM through an interface circuit. Each color code from the CPU represents a color of a respective one of the display elements (e.g. pixel) constituting a still image on the screen. In operation, in response to a display command from the CPU, the IDPC sequentially reads dot data from the VRAM in synchronization with the scanning position on the CRT display and outputs the dot data to a color palette circuit. Concurrently, the IDPC calculates and reads data necessary for displaying an animation image from the VRAM and supplies color codes to the color palette circuit. Where an animation and still image are located at a same display position on the screen of the CRT display, the animation image is preferably displayed. The color palette circuit converts each color code into three color data for red, green, and blue, each composed of three bits. A Digital to Analog Converter (DAC) converts the color data from the color palette circuit into R, G, and B signals which are provided to the CRT display.

U.S. Pat. No. 5,355,175 (Okada et al.), issued on Oct. 11, 1994, discloses video mixing apparatus that mixes a graphics video image and a playback video image at a plurality of mixture ratios in one image plane. Fade data indicative of the mixing ratio of at least one line of the playback video signal and the graphics video signal is sequentially generated in accordance with a predetermined order. The fade data is held in holding means and is outputted from the holding means synchronously with a horizontal sync signal. The levels of the playback video signal and the graphics video signal are individually adjusted in accordance with the fade data outputted from the holding means, and the adjusted signals are added together. The playback video signal and the graphics video signal are mixed at the mixing ratio set for every line on one image plane to generate a video output signal from the apparatus.

U.S. Pat. No. 4,420,770 (Rahman), issued on Dec. 13, 1983, discloses a video background generation system for generating rectangular video patterns having operator-selected video attributes. The system comprises a horizontal bit memory and a vertical bit memory, each of the memories being a 16 entity memory for storing information for 16 background entities. The memory for each background entity defines opposite corners of the background area for an entity on the screen. As shown in FIG. 2 of the patent, a first entity defines a first rectangular area, and a second higher priority entity defines a second partially overlapping rectangular area. An attribute look-up table stores information for each entity related to the color video output (red, green, blue) for that entity. During the scanning of the lines of a picture being produced, the first entity is produced in its defined area and the second entity is produced in its defined area. However, the second entity has a higher priority which results in the overlapping region of the two entities to be presented with the stored attributes of the second entity.

U.S. Pat. No. 4,754,270 (Murauchi), issued on Jun. 28, 1988, discloses digitized displaying apparatus which is capable of enlarging or reducing a display size on the screen of a raster scanning type display such as a CRT display. The apparatus comprises an addressable memory means, input data means, and variable address data generating means. The addressable memory means stores display data to be read out in a predetermined timing relationship with a raster scanning of the display to produce a display image. The input data means supplies numerical data that determines image size. The variable address data generating means includes variable addressing increments for generating address data that is correlated with display data addresses that are stored in the memory means to output the display data. More particularly, the variable address data generating means comprises arithmetic calculating means for digitally calculating addressing increments in response to the numerical data supplied by the input data means and to timing signals related to the scanning of the display. The variable address data generating means is responsive to the arithmetic calculating means to increment addresses for addressing the memory means according to the numerical data that determines the image size. More particularly, when displaying an original size, a horizontal address of the memory means is incremented by a "1" at every 200 nanoseconds. In other words, dot size in the horizontal direction of the display is 200 nanoseconds for displaying the original size. The size in the horizontal direction can be enlarged or reduced by changing the displaying time of one dot in the horizontal direction by properly selecting addend data provided to the memory means. By the appropriate setting of addend data supplied to the variable address data generating means, the size of characters and the associated images on the display screen can be enlarged or reduced with respect to a nominal size.

Presently, there is emerging a need for interactive video graphics which will enable a whole new class of services to be delivered to the home via a cable television network. These new services will enhance the viewing experience for many traditional television programs while providing augmented services to others. However, NTSC and Phase Alternating Line (PAL) television receivers, unlike computer monitors, have a fairly low video bandwidth and employ an interlaced, not a progressive scan, display. These limitations place severe constraints on the generation of an artifact free high resolution synthetic video signal. Traditionally, consumer products, such as video games, avoid these problems by generating low resolution non-interlaced video signals. This approach results in images that are of low quality, have a "blocky" appearance, are limited in color choice, and take on a cartoon-like look. The generation of synthetic video that approaches broadcast quality requires that the generated synthesized signals emulate that of a video camera scanning a scene and the subsequent analog signal processing for such video camera signals. Therefore, it is desirable to provide a relatively inexpensive arrangement that permits good synthetic video graphics to be overlaid on top of live television programming for viewing on a standard NTSC or PAL standard interlaced television receivers with the ability to shrink or magnify video graphics data during transfer from a Graphics Memory to the screen of a television receiver.

SUMMARY OF THE INVENTION

The present invention is directed to video magnification apparatus for shrinking or magnifying video graphics during a transfer of the video graphics data signals from a graphics memory to a television screen.

Viewed from one aspect, the present invention is directed to apparatus for modifying the magnification of a graphic prior to displaying the graphic on a television receiver, the apparatus comprising first and second magnification modifying means. The first magnification modifying means modifies the magnification of a graphic by a first independent predetermined magnification factor in a vertical direction by generating graphic line address output signals. The graphic line address output signals are used to selectively prevent a transmission of predetermined horizontal lines of the graphic upon the reception of a vertical magnification factor that is less than unity. Still further, the graphic line address output signals are used for causing a selective repeating of the transmission of predetermined horizontal lines of the graphic upon the reception of a vertical magnification factor that is greater than unity. The second magnification modifying means is responsive to the transmissions of horizontal lines of the graphic indicated for transmission by the graphic line address output signals of the first magnification modifying means for modifying the magnification of the graphic in a horizontal direction by a second independent predetermined horizontal magnification factor. Still further, the second magnification modifying means selects N predetermined pixels of each received X pixel group that are multiplexed into an transmitting X pixel group for transmission in each output signal of the apparatus for a horizontal magnification factor equal to or less than unity for transmission in each output signal of the apparatus, where $N \leq X$. Additionally, the second magnification modifying means causes a repeating of pixels of each received X pixel group by a predetermined integer amount corresponding to a received horizontal integer magnification factor that is greater than unity.

Viewed from another aspect, the present invention is directed to apparatus for modifying the magnification of a graphic prior to displaying the graphic on a television receiver comprising vertical magnification modifying means. The vertical magnification modifying means comprises magnification inverting means and multiplying means. The magnification inverting means inverts the value of a received vertical magnification factor and generate therefrom an output signal representative of the inverted magnification factor. The multiplying means is responsive to the output signal from the magnification inverting means and an input signal representing a number of a horizontal line of the graphic currently being accessed for multiplying the inverted magnification factor with the number of the horizontal line to generate an output signal representing a line number of the graphic to be accessed.

Viewed from still another aspect, the present invention is directed to apparatus for modifying the magnification of a graphic prior to displaying an image of the graphic on a television receiver comprising a horizontal magnification modifying means comprising a pixel select Read-Only-Memory (ROM), a multiplexer drive ROM, and pixel multiplexing means. The pixel select ROM is responsive to a received horizontal fractional magnification value for generating a horizontal fractional magnification output signal indicating which pixels of an incoming group of a plurality of X pixels are to be used in generating an output signal of the apparatus. The multiplexer drive ROM is responsive to the horizontal fractional magnification output signal and a received horizontal integer magnification value for generating separate coded output signals during sequential multiplexing cycles. The multiplexer drive ROM coded output signals indicate which received pixels of an incoming group of a plurality of Y pixels are to be multiplexed into which output pixels of an outgoing group of a plurality of Y pixels. The pixel multiplexing means is responsive to the coded output signals from the multiplexer drive ROM and a reception of the incoming group of the plurality of Y pixels for multiplexing predetermined ones of the Y pixels of the incoming group into predetermined ones of the plurality of Y pixels of the outgoing group during each predetermined cycle to form an apparatus output signal.

The invention will be better understood from the following more detailed description taken with the accompanying drawings.

BRIEF DESCRIPTION OF THE DRAWINGS

FIG. 11 shows a first page of a multi-page spreadsheet illustrating the operation of a Multiplexer Drive ROM shown in FIG. 7 in accordance with the present invention;

FIG. 12 shows a middle page of a multi-page spreadsheet illustrating the operation of a Multiplexer Drive ROM shown in FIG. 7 in accordance with the present invention;

DETAILED DESCRIPTION

It is to be understood that corresponding elements performing the same function in each of the figures have been given the same designation number.

Figure 1:
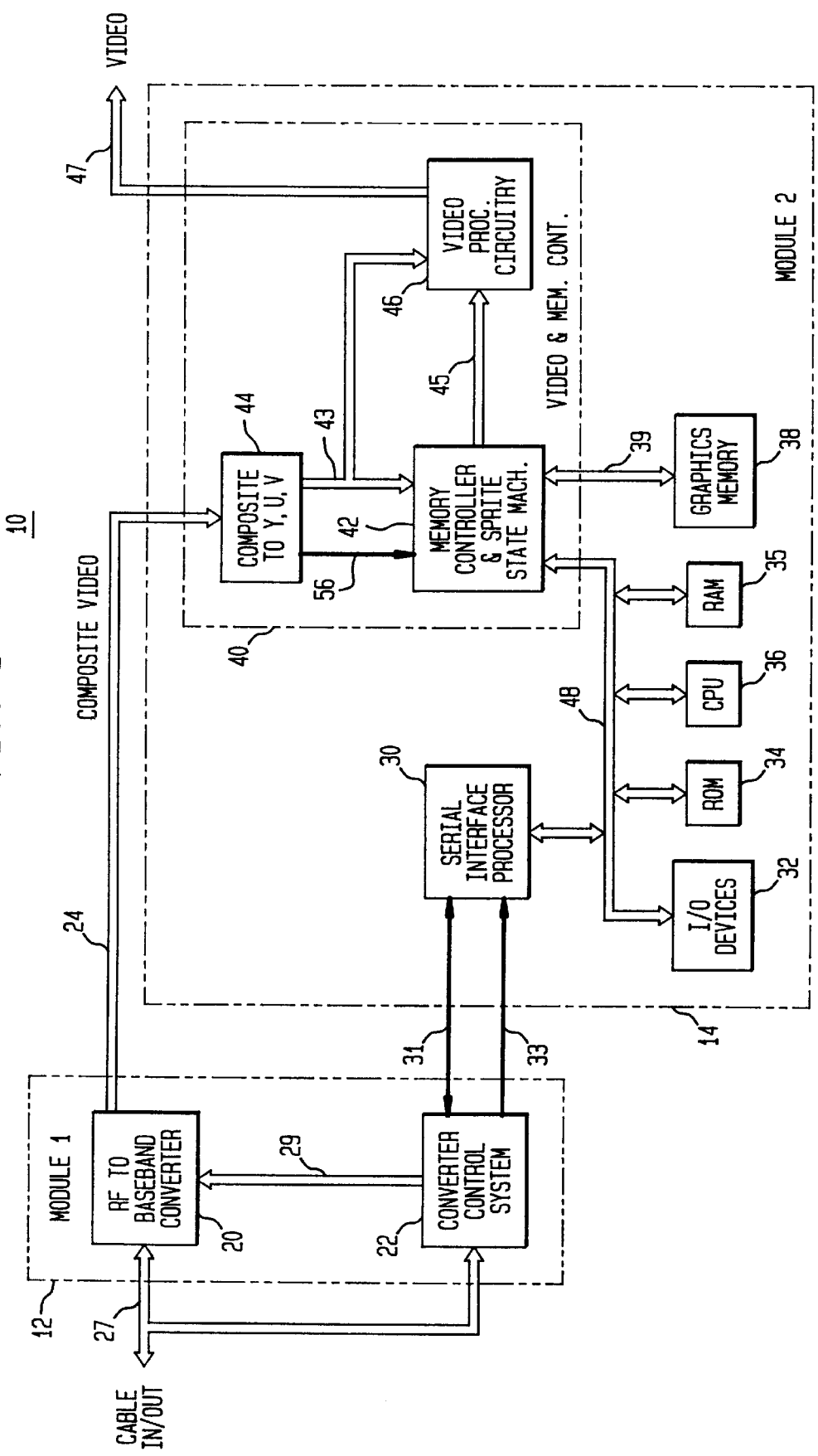
FIG. 1 is a block diagram of a subscriber cable box unit in accordance with the present invention.

Referring now to FIG. 1, there is shown a block diagram of a subscriber cable box unit 10 that can be found on a subscriber's premises that provides interactive video processing in accordance with the present invention. The subscriber cable box unit 10 comprises a first module (MODULE 1) 12 (shown within a first dashed line rectangle) and a second module (MODULE 2) 14 (shown within a second dashed line rectangle). The first module 12 is a conventional arrangement that comprises a Radio Frequency (RF) to Baseband Converter 20 and a Converter Control System 22, each of which are known in the art. The RF to Baseband Converter 20 receives multiplexed RF television channel signals in the NTSC or PAL standard format propagating on a cable 27 from a remote cable company central office (not shown), and selectively converts such multiplexed RF television channel signals from their multiplexed channel frequencies to baseband frequencies. The RF to Baseband Converter 20 transmits a resultant baseband composite video output signal from the conversion process over a bus 24 to the second module 14. The Converter Control System 22 is user (subscriber) is typically controlled by either an Infra Red remote control device or a keypad on the cable box as is well known in the art. The Converter Control System 22 functions to receive and/or transmit authorization and access control signals via the cable 27 to or from a remote cable company central office, activate baseband video scrambling or descrambling, and produce On Screen Display (OSD) messaging. The Converter Control System 22 outputs control signals via a bus 29 to the RF to Baseband Converter 20 for selecting desired channel programming, and various control and decrypted data signals (e.g., control and upstream data output signals, Infra Red receive and transmit signals, and decrypted T1 Quadrature Phase Shift Keying data signals) via leads 31 and 33 to the second module 14.

The second module 14 comprises a Serial Interface Processor (SIP) 30, Input/Output (I/O) devices 32, a Read Only Memory (ROM) 34, a Random Access Memory (RAM) 35, a Central Processing Unit (CPU) 36, a Graphics Memory 38, and a Video and Memory Control (VIDEO & MEM. CONT.) integrated circuit 40 (shown within a dashed line rectangle). The SIP 30, I/O devices 32, ROM 34, RAM 35, CPU 36, and a Memory Controller and Sprite State Machine (MACH.) 42 of the Video and Memory Control integrated circuit 40 are interconnected by a data bus 48. The CPU 36 can comprise any suitable processing unit and, in accordance with the present invention, is a 386 type CPU which is relatively inexpensive. The ROM 34 can comprise any suitable memory as, for example, an EPROM for initialization purposes and for programming of the CPU 36. The RAM 35 can comprise any suitable memory as, for example, two 256 Kilobyte-by-16 bit DRAMs connected in series to provide a 512K-by-16 bit RAM configuration for use as a scratchpad memory for the CPU 36. The Graphics Memory 38 can comprise any suitable memory as, for example, a 32 bit wide RAM area or preferably two 256K-by-16 bit DRAMs arranged in parallel for use with a 32-bit wide bus 39. The Graphics Memory 38 is used to store sprite data relating to graphics and video pictures. The use of a 32-bit wide bus 39 permits the use of fast-page mode memory addressing for both a Memory Controller and Sprite State Machine 42 and a block memory mover (not shown) forming part of the Video and Memory Controller 40. By significant use of block mode memory addressing, an average data transfer rate of approximately 52 nanoseconds can be achieved, which corresponds to processing approximately 77 million bytes of data per second.

The SIP 30 functions to handle data communications between the first module 12 and the second module 14. More particularly, the SIP 30 handles all data transfer signals between the second module 14 and the converter control system 22 of the first module 12. These data transfer signals can have formats such as, for example, a T1-like data stream at 1.5 Mbits/second which involves the bulk of the communication transfers, and raw data from an infrared receiver (not shown) in the converter control system 22. The SIP 30 can also include a full duplex synchronous serial port (not shown) for future expansion. Such data transfer signal formats are used to communicate between the converter control system 22 on the first module 12 and the CPU 36 in the second module 14 to activate desired actions in the second module 14.

The Video and Memory Control integrated circuit 40 comprises the Memory Controller and Sprite State Machine 42, Composite to YUV circuitry 44, and Video Processing (PROC.) circuitry 46. The Memory Controller and Sprite State Machine 42 is coupled to the Graphics Memory 38 by a data bus 39, and to the Video Processing circuitry 46 by a data bus 45. The Composite to YUV circuitry 44 receives the baseband composite video signal from the bus 24 and outputs resultant YUV video signals to the Memory Controller and Sprite State Machine 42 on a bus 43. The Video Processing circuitry 46 receives video signals from the Memory Controller and Sprite State Machine 44 over the data bus 45, and outputs NTSC or PAL standard video signals on a bus 47 to a remote television receiver (not shown) or to further processing circuitry (not shown). It is to be understood that the present invention lies within the area of the Video and Memory Control integrated circuit 40 and the Graphics Memory 38. The elements of the first module 12 and the second module 14 were introduced and discussed hereinbefore for a better understanding of how the present invention fits into the interactive subscriber cable box unit 10.

Figure 2:
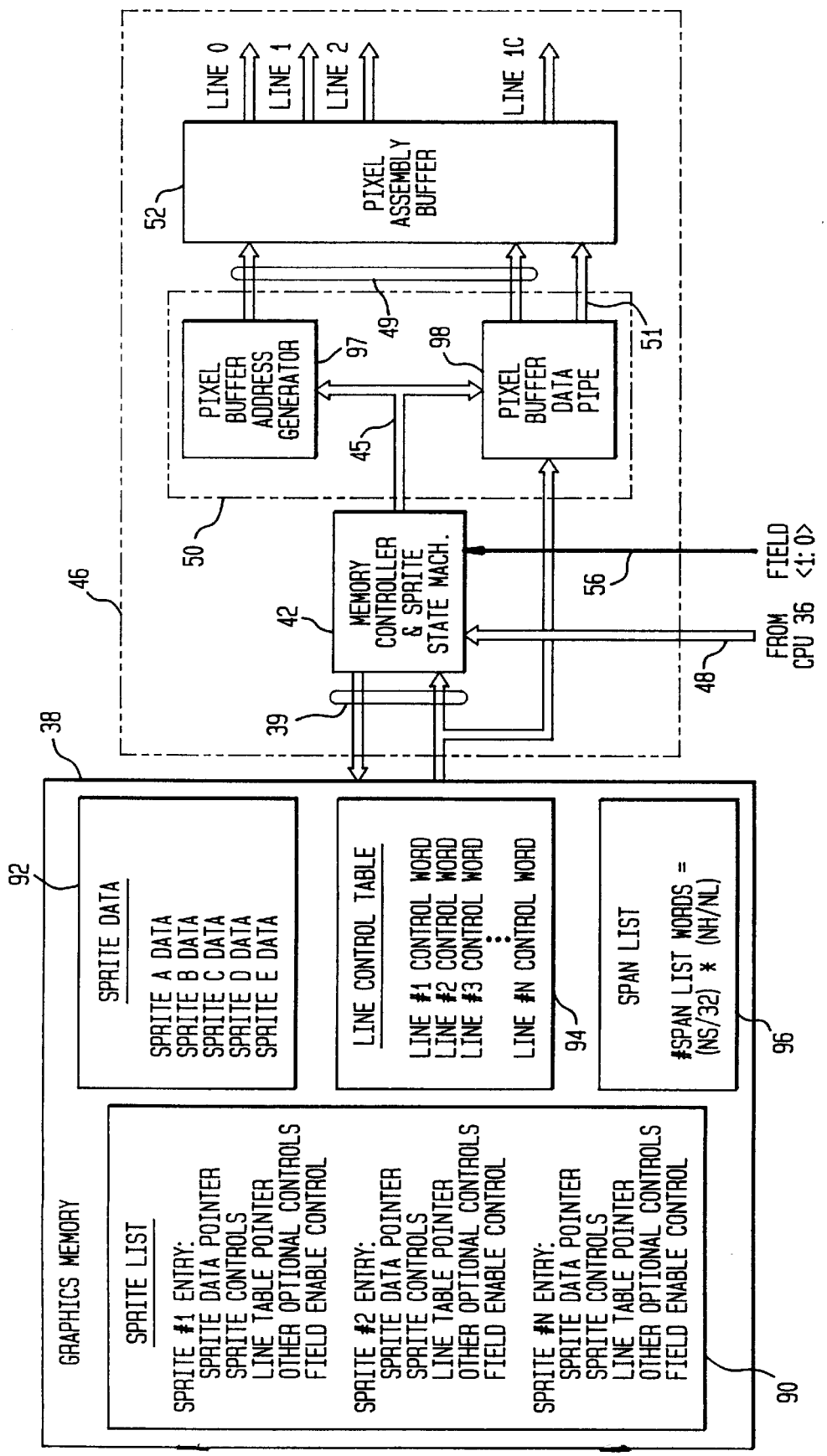
FIG. 2 is a block diagram of a first portion of a Video Processing Circuitry found in the subscriber cable box unit of FIG. 1 in accordance with the present invention.
Figure 3:
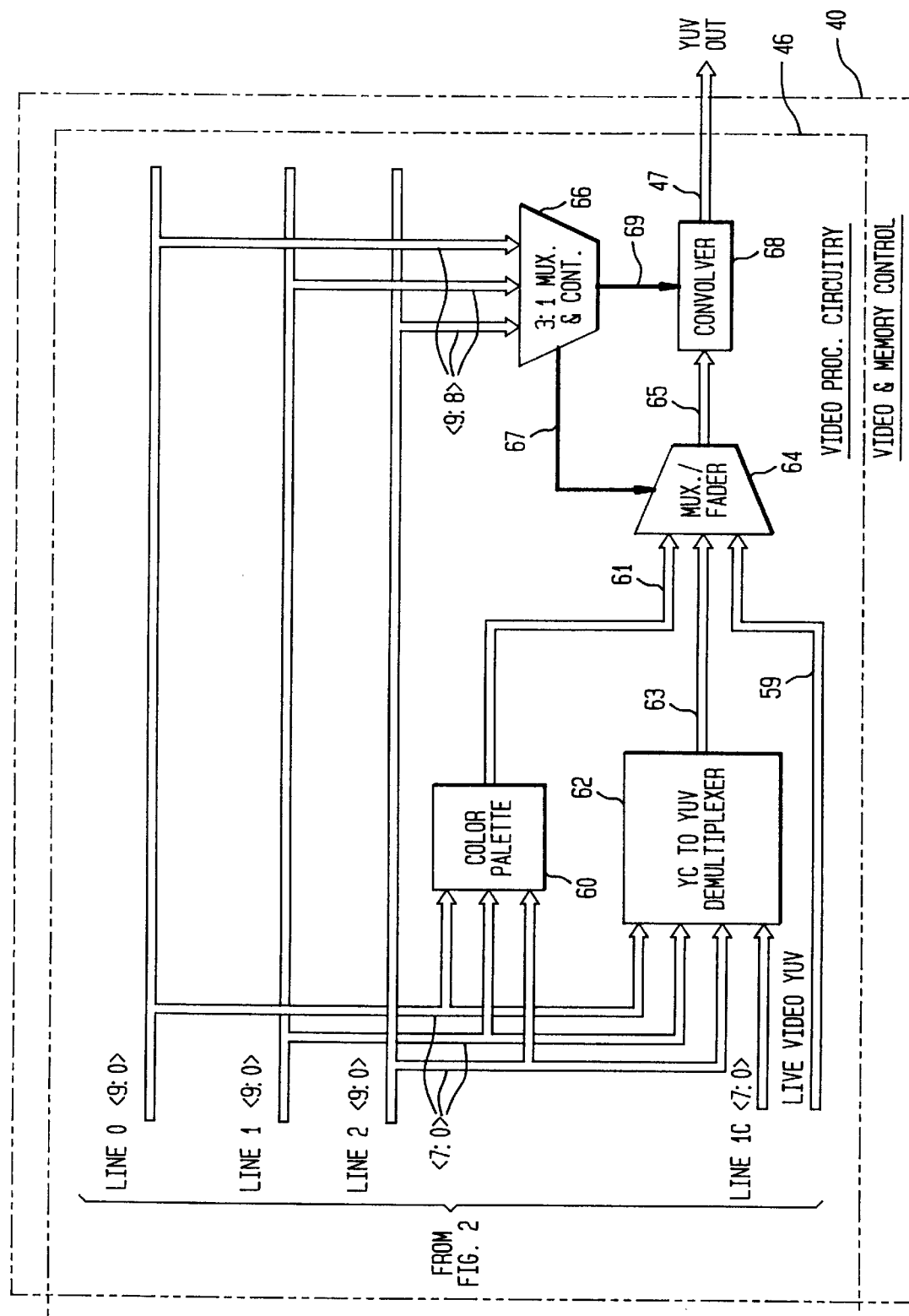
FIG. 3 is a block diagram of a second portion of a Video Processing Circuitry found in the subscriber cable box unit of FIG. 1 in accordance with the present invention.

Referring now to FIGS. 2 and 3, there are shown block diagrams of first and second portions, respectively, of a Video Processing Circuitry 46 (shown within a first dashed line rectangle) found in the second module 14 of the subscriber cable box unit 10 of FIG. 1 in accordance with the present invention. As is shown in FIG. 2, a Graphics Memory 38, forming an element of the second module 14 of FIG. 1, is coupled for bidirectional communication via a data bus 39 to a Memory Controller and Sprite State Machine 42 which is part of a Video and Memory Controller 40 (shown within a second dashed line rectangle) found in the second module 14 of FIG. 1.

The Memory Controller and Sprite State Machine 42 is coupled to a Central Processing Unit (CPU) 36 (shown in FIG. 1) via a bus 48 for writing sprite information into the Graphics Memory 38 via the bus 39, and receives a Field <1:0> signal from the Composite To Y,U,V circuitry 44 of FIG. 1 via conductor 56. This portion of the Video Processing Circuitry 46 further comprises a Data Pipe 50 (shown within a dashed-line rectangle), and a Pixel Assembly Buffer 52.

The Graphics Memory 38 comprises multiple Tables comprising a Sprite List table 90, a Sprite Data table 92, a Line Control table 94, and a Span List table 96. These Tables are discussed in great detail in copending patent application Ser. No. 08/523,394 (Butler et al.), filed on the same date as the present application for the present assignee. More particularly, the Sprite List table 90 comprises a separate memory section for each of one or a plurality of N sprites (only entries for sprites #1, #2, and #N are listed). As is shown for the Sprite #1 entry, the memory section therefor comprises a Sprite Data Pointer portion, a Sprite Controls portion, a Line Table Pointer portion, an Optional Controls portion, and a Field Enable Control portion. The Sprite Data Pointer portion is used to access the Sprite Data Table 92 at a predetermined location for pixel data for horizontal lines associated with the Sprite Entry. The Sprite Controls portion comprises data relating to, for example, the size of the sprite, its X and Y location or position on the screen of the television receiver, and special effects information about magnification, warping, etc. that is to be performed on the sprite. More particularly, if the Sprite Controls portion indicates that a sprite has a magnification of 2, then every line of the sprite is magnified by 2. Similarly, if the Sprite Controls portion indicates that a sprite has an offset of 2, then all lines of the sprite are offset by 2. In other words, the Sprite Controls portion affects each horizontal line of pixel data of the sprite the same way.

The Line Table Pointer portion of each Sprite Entry is used to access a predetermined portion of the Line Control Table 94 for control words associated with that Sprite Entry in order to produce more advanced special effects from that produced by the Sprite Controls portion discussed above. Finally, the Field Enable Control portion is used to produce desired "smoked glass" (transparent overlay) effects on the screen of the television receiver for the Sprite Entry being accessed in the Sprite List table 90. Similar portions are shown for each of the other sprite #2 to #N entries. Still further, the sprites in the Sprite List table 90 are preferably listed in order of increasing priority where, for example, the sprite #1 entry has a lowest priority and the sprite #N entry has a highest priority. As a result of such priority arrangement, pixels of a sprite with a higher priority overwrite, replace, or take precedence over pixels of a sprite with a lower priority where two sprites or a sprite and live video are located in an overlapping location on a screen of a television receiver.

The Sprite Data table 92 comprises data words including pure data for each of the pixels of each horizontal line for each Sprite Entry of the Sprite List table 90. In other words, when a Sprite Entry is accessed in the Sprite List table 90, the Sprite Data Pointer portion directs the access into the Sprite Data table 92 where the Sprite Data words (e.g., Sprite A Data word to Sprite C Data word) for that Sprite Entry are stored in the Sprite Data table 92 of the Graphics Memory 38. It is to be understood that these Sprite Data words do not include the numerical number of lines in the sprite since the size of the sprite, the location on the screen of the television receiver, etc., for that sprite is located in the Sprite Controls portion of the Sprite List Entry. The Sprite List table 90 and the Sprite Data table 92 work together by the Memory Controller and Sprite State Machine 42 first accessing The Sprite List table 90 and then, under control of the Sprite Data Pointer portion, accessing the Sprite Data table 92 to retrieve the data that tells the Video Processing Circuitry 46 to draw the sprite in the manner described by the Sprite Data words.

The Line Control Table 94 of the Graphics Memory 38 is an optionally used table that contains subtables of separate predetermined lengths (only one subtable is shown including N control words), where each subtable comprises a separate line control word for each line of a sprite. The line control words in the Line Control Table 94 provide independent controls for the horizontal lines of that sprite. More particularly, as stated hereinabove, the Sprite Controls portion of each Sprite Entry in the Sprite List table 90 affect every line of a sprite in the same manner. In contrast, the Line Control Words in a subtable in the Line Control Table 94 for a Sprite Entry, as pointed to by the Line Table Pointer portion of the Sprite List table 90, are used to provide independent controls for each of the horizontal lines of that sprite. For example, it is assumed that the Sprite Controls portion for the Sprite #1 Entry indicates that the Sprite #1 image includes ten lines at a location X and Y on the screen of the television receiver without any special effects such as constant offsets. The pixel data for each of the ten lines of the Sprite #1 image is provided in the Sprite Data table 92 beginning at the address therein indicated by the Sprite Data Pointer portion of the Sprite #1 Entry. Special effects that might be used for any one or more of the ten lines of Sprite #1 are found in certain ones of the line control words in the Line Control Table 94 beginning at the address indicated by the Line Table Pointer portion of the Sprite #1 Entry. In other words, the edges of the image of Sprite #1 might be aligned in a straight line on the screen of the television receiver.

However, with the line control words of the Line Control Table 94, each line of Sprite #1 Entry can have, for example, different offsets for warping the image in a predetermined manner. For example, a sprite image can be warped using the associated line control words Line Control table 94 to appear on the outside surface of a three-dimensionally drawn cylinder.

The Span List table 96 is an optional table which is used to save time in processing many Sprite Entries in the Sprite List table 90. In prior art systems, each of the Sprite Entries in a Sprite List table 90 are sequentially entered to determine if that sprite exists in a pixel being assembled for a horizontal line using the size and the X and Y location on a display screen designated for that sprite. As a result, the prior art systems, for example, for playing games were limited to a few number of sprites (e.g., N=8 or 16 sprites) in order to assemble the pixels for each line within the time period necessary for displaying such horizontal line on the display screen.

In the present subscriber cable box unit 10, without the optional Span List table 96 being present, the Memory Controller and Sprite State Machine 42 normally accesses each of the plurality of N Sprite Entries listed in the Sprite List table 90 of the Graphics Memory 38 in sequence to determine which of the N Sprite Entries exist in each pixel of the horizontal line being assembled. In accessing each of the N Sprite Entries of the Sprite List table 90, the Memory Controller and Sprite State Machine 42 obtains the data from the Sprite Data table 92 and the optional Line Control Table 94 effects needed for each sprite to produce the pixel data for each horizontal line being assembled in the Pixel Assembly Buffer 52. However, if the Memory Controller and Sprite State Machine 42 has to access and process, for example, 96 different Sprite Entries, the time necessary to process the 96 sprites would exceed a time period permitted for assembling each horizontal line of pixel data in the Pixel Assembly Buffer 52. The use of the Span List table 96 overcomes this problem.

Where the optional Span List table 96 is used, at least one register (not shown) in the Memory Controller and Sprite State Machine 42 indicates that the Span List table 96 exists, and provides all the data necessary for the Memory Controller and Sprite State Machine 42 to properly use the Span List Table 96, including a portion designated "# Sprite Entry Words" which contains a number (integer value) of words (NW) per Sprite List Entry which is a constant integer value for each of the Sprite Entries when the Span List table 96 exists. More particularly, each Sprite Entry in the Sprite List table 90 can include words for (1) a Sprite Data Pointer, (2) Sprite Controls, (3) an optional Line Table Pointer word, (4) an optional word for Optional Sprite Controls, and (5) an optional Field Enable Control Word. Therefore, each Sprite Entry of the Sprite List table 90 can contain from 2–5 words. When a Span List table 96 is used, each of the Sprite Entries of the Sprite List 90 includes a same number of words (e.g., 5 words) regardless of what optional words are normally required for each Sprite Entry. The purpose of the register which indicates the Number of Sprite Entry Words in each Sprite Entry is to simplify an accessing of only certain ones of the Sprite Entries of the Sprite List table 90 when building the pixels of a horizontal line.

The Span List table 96 comprises one span list control word or a group of span list control words that describe which of the N sprites found in the Sprite List table 90 exist in each line of a separate one of an arbitrarily defined plurality of horizontal sections of a television screen. It is to be understood that the Span List table 96 is primarily used where there are many sprites (e.g., N=96 sprites) in order to reduce processing time in assembling the pixel data for each of the horizontal lines in the Pixel Assembly Buffer 52. The number of words in the Span List table 96 is dependent on the Equation:

$$\text{No. of Span List words} = (NS/32)*(NH/NL), \qquad \text{Eq. 1}$$

where NS is the number of total sprites on the display screen, NH is the number of lines in the display screen, NL is the number of lines on the screen of a television receiver per span list word or group of words, and 32 represents the exemplary number of bits available in each word of the Span List table 96. The values for NH and NL are programmable numbers, and NL can have a value of, for example, 2, 4, 8, 16, 32, 64, or 128. More particularly, although there electrically are 525 horizontal lines of video in two fields of a standard NTSC television display, only about 440–500 lines are normally seen depending on the television receiver used. The display area of the screen where the 96 sprites are to displayed can vary from 0–500 lines for any predetermined number of sections, where each section has an equal number (NL) of lines.

In operation, the Memory Controller and Sprite State Machine 42 determines from the one or more registers therein that a Span List table 96 exists, also obtains the data (NS, NH, and NL values, the start line for the display area, and the number of sprites) that are stored therein and needed for use with the Span List table 96, and determines the number of Span List words needed for each section of the display area in accordance with Equation 1 above. In assembling the pixel data for the 525 lines of the video display, when the Memory Controller and Sprite State Machine 42 reaches the start line for the Span List display area the Memory Controller and Sprite State Machine 42 first accesses the Span List words (e.g., first three words) associated with a top section of the span list display area. From these first three words of Span List table 96, the Memory Controller and Sprite State Machine 42 determines that, for example, only Sprite Entries 1, 2, 4, and 6 are active in this section.

It is to be understood that the Memory Controller and Sprite State Machine 42 uses a same one or more Span List words for each of the lines of a section since the same sprites are active in each of the lines of that section. The Memory Controller and Sprite State Machine 42 operates in the same manner for each of the other sections of the display area covered by the Span List words.

The Field Enable Control portion of each Sprite Entry in the Sprite List table 90 relates to controls for forming a "Smoked Glass" (transparent overlay) effect with two sprites or one sprite over live video. More particularly, a "smoked glass" effect is defined as an overlapping area of two sprites, or one sprite over live video, where a first sprite is displayed on the screen of a television receiver on lines (e.g., even lines) of a first field of a picture, and a second sprite or live video is displayed on the screen of a television receiver on lines (e.g., odd lines) of a second field of a picture. Such effect allows an image of the first sprite to be seen while also seeing an image behind it of the second sprite which can be, for example, a captured snapshot of a frame of a live video that is stored as a Sprite Entry in the Graphics Memory 38, or actual live video. The two dimensional Convolver 68 then processes the assembled image to produce a "Smoked Glass" effect between the two sprites. Prior art systems primarily use software to computationally combine two images.

In accordance with the present invention, the Field Enable Control portion of the Sprite Entry indicates that this Sprite is only to be displayed in the even-numbered or odd-numbered lines of the area of the display screen indicated for that sprite. When assembling the pixel data in each horizontal line of a display for the Sprite Entries of the Sprite List table 90, the Field Enable Control indicates whether such sprite exists on a horizontal line or not with its designated area on a display screen. This is a simple and inexpensive method of permitting a graphic or sprite to be inserted or turned on in just one of the two fields.

In order for the Memory Controller and Sprite State Machine 42 to produce the "Smoked Glass" effect, it needs to know which field is currently being displayed on the screen of the television receiver. This information indicating the current video field is provided to the Memory Controller and Sprite State Machine 42 by a 2-bit field signal (FIELD <1:0>, which indicates bits 1 and 0) transmitted by a remote video sync circuit (not shown) generally located at the Composite To Y,U,V circuitry 44 (shown in FIG. 1) of the subscriber cable box unit 10 and obtained from a received live video signal stream. This 2-bit Field signal is basically a continuously running clock signal.

The Memory Controller and Sprite State Machine 42 also reads a 4-bit Field Enable control from the associated Sprite List Entry which indicates which field to enable of two frames stored for a sprite. It is to be understood that the entire information for the color of a color picture is transmitted within four fields of two frames in order to explain why four bits are needed for the Field Enable Signal, where each frame has two fields. Still further, the use of the two frames is not a matter of displaying the color picture, but instead it becomes a matter of the artifacts (e.g., flickering, etc.) produced on the screen of an interlaced television receiver. More particularly, in an NTSC color video signal, there are (a) 227.5 color bursts sent in each horizontal line of the picture, (b) 262.5 lines for each of two fields of a frame, and (c) 525 lines in a frame comprising the two fields. Because there are 227.5 color burst per line, if the color bursts on line 0 of field 0 go in a positive direction at a certain point, then on the next line (line 2) of field 0 the color bursts go in a negative direction at a certain point because each line contains a sequence of whole color burst plus a half of a color burst rather than a sequence of just whole color bursts. Still further, because there are an odd number of lines (525) in a frame, the color bursts in the first line (line 0) of field 0 of the next (second) frame will go in a negative direction and will be opposite in direction from color bursts in line 0 of field 0 of the immediately previous frame. Thus, to get a positive going color burst in line 0 of field 0 of a frame, the repeat pattern only occurs every second frame. It is to be understood that the whole content for a color picture is present after the first frame, but that the repeat patterns of the artifacts (e.g., flickering, etc.) are a by-products of a four frame cycle. This is a result of a compromise originally made in forming the NTSC standard for transmitting color television signals that are compatible with black-and-white television signals.

When a snapshot of a live television picture is placed into the Graphics Memory 38 as a Sprite Entry in the Sprite List table 90, only one frame comprising two fields needs to be stored to subsequently re-display the picture on the screen of a television receiver. The 4-bit Field Enable control is used by the Memory Controller and Sprite State Machine 42 to indicate when a sprite is to be accessed in a certain frame or field depending on the code of the four bits. For example, a "1" in bit three of the Field Enable signal indicates that the associated sprite should be enabled in frame 1, and a "1" in bit two of the Field Enable signal indicates that the associated sprite should be enabled in frame 0. Similarly, a "1" in bit one of the Field Enable signal indicates that the associated sprite should be enabled in field 1, and a "1" in bit zero of the Field Enable signal indicates that the associated sprite should be enabled in field 0. Therefore, bits 3 and 2 are used for double frame buffered sprites while bits 1 and 0 are used to either produce a "smoked glass" effect where the sprite is only seen in one field, or for double frame buffered sprites where a sprite is seen in both fields. The Memory Controller and Sprite State Machine 42 compares the Field and Field Enable signals to determine which of the four unique fields in the two frames is currently turned on in order to display the sprite in its desired horizontal line locations, and for remodulation to the NTSC picture to be displayed on the television receiver screen by remote processing circuits (not shown) to provide correctly directed color bursts. More particularly, the information for the four field, as determined from the Field and Field Enable signals, is used for double line buffering in the Pixel Assembly Buffer 52 to determine which sprite data is to be placed in each pixel location of the Double Line Buffers 53, 54, and 55 (shown only in FIG. 4). When the comparison of the Field and Field Enable signals indicate a match of fields, the sprite data is read from the Sprite Entry table 90, the Sprite Data Table 92, and the Line Control table 94 in the Graphics Memory 38, and Double Line Buffers 53–55 (shown only in FIG. 4) in the Pixel Assembly Buffer 52 are appropriately loaded during a certain field or frame. A register (not shown) in the Memory Controller and Sprite State Machine 42 is updated from the CPU 36 via bus 48 when necessary to indicate which field and/or frame is desired for loading the data of a Sprite Entry in the Sprite List table 90 into the Pixel Assembly Buffer 52.

The use of simple control words or groups of bits, and a comparator for comparing Field and Field Enable signals to determine repeat patterns in horizontal lines of NTSC video signals permits a "smoked glass" effect to be formed on an interlaced display. This is in contrast to performing the same functions all in software that requires a powerful and typically relatively expensive software processor with a great deal of programming as is found in some prior art systems. In such prior art systems the processor (e.g., CPU 36 in FIG. 1) takes a part in building the picture which requires a relatively expensive CPU 36, and if the processor shuts down the building of the picture stops. An advantage of the present subscriber cable box unit 10 is that if the CPU 36 shuts down, any animation of the picture being displayed stops because the CPU 36 is not providing information of what things to move around. However, the picture is self-sustaining. More particularly, as long as the Graphics Memory 38 is not corrupted, the video graphics portion of the Video and Memory Controller 40 shown in FIGS. 2, 3, and 9 knows how to build the picture from data in the Graphics Memory 38.

Returning now to FIG. 2, the first portion of the Video Processing Circuitry 46 comprises a Data Pipe 50 (shown within a dashed line rectangle), and a Pixel Assembly Buffer 52. The Data Pipe 50 comprises a Pixel Buffer Address Generator 97 and a Pixel Buffer Data Pipe and Magnification Circuit (PIXEL BUFFER DATA PIPE AND MAG. CKT.) 98. The Pixel Buffer Address Generator 97 and the Pixel Buffer Data Pipe and Magnification Circuit 98 each receive control data over a bus 45 that was obtained by the Memory Controller and Sprite State Machine 42 from the Graphics Memory 38, and the Pixel Buffer Data Pipe and Mag. circuit 98 also receives Sprite data over the Memory Data Bus 39, for a particular sprite for transmission to the Pixel Assembly Buffer 52. The Pixel Buffer Address Generator 97 transmits address output signals while the Pixel Buffer Data Pipe and Magnification Circuit 98 transmits control and data output signals to the Pixel Assembly Buffer 52 via respective buses 49 and 51. The Pixel Buffer Address Generator 97 and the Pixel Buffer Data Pipe and Magnification Circuit 98 use pixel data obtained from a Sprite Control word in a Sprite Entry, a Sprite Data table 92, and any other information from a Line Control table 94 in the Graphics Memory 38 to place the data for each pixel of a horizontal line of pixels in an appropriate address location within Double Line Buffers 53, 54, and 55 (shown only in FIG. 4 and discussed hereinafter) of the Pixel Assembly Buffer 52. Special effects like magnification, warping, etc. to be performed on horizontal lines of a Sprite Entry are obtained from the Sprite Control words in the associated Sprite Entry and from any associated line control words in the optional Line Control table 94 of the Graphics Memory 38. The Pixel Buffer Address Generator 97 of the Data Pipe 50 uses this information to appropriately alter the pixel address in a line of sprite data obtained from the Sprite Data table 92 of the Graphics Memory 38 to achieve the designated special effect. This altered address is sent to the Pixel Assembly Buffer 52 via bus 49 for use in placing the associated pixel data in the pixel location designated by the altered address in the Double Line Buffers 53, 54, or 55 of the Pixel Assembly Buffer 52 to subsequently provide the designated special effect on the television screen. The Pixel Buffer Data Pipe and Magnification Circuit 98, which is discussed in greater detail hereinafter, concurrently receives the pixel data for the pixel address, and transmits the pixel data to the Pixel Assembly Buffer 52 for storage at the address of the Double Line Buffer 53, 54, or 55 generated by the Pixel Buffer Address Generator 97. The Pixel Assembly Buffer 52 outputs luminance pixel data for three adjacent horizontal lines of any sprite to be displayed on those lines on buses designated LINE 0, LINE 1, and LINE 2, and outputs chrominance pixel data associated with the LINE 1 luminance output data on a LINE 1c.

Figure 4:
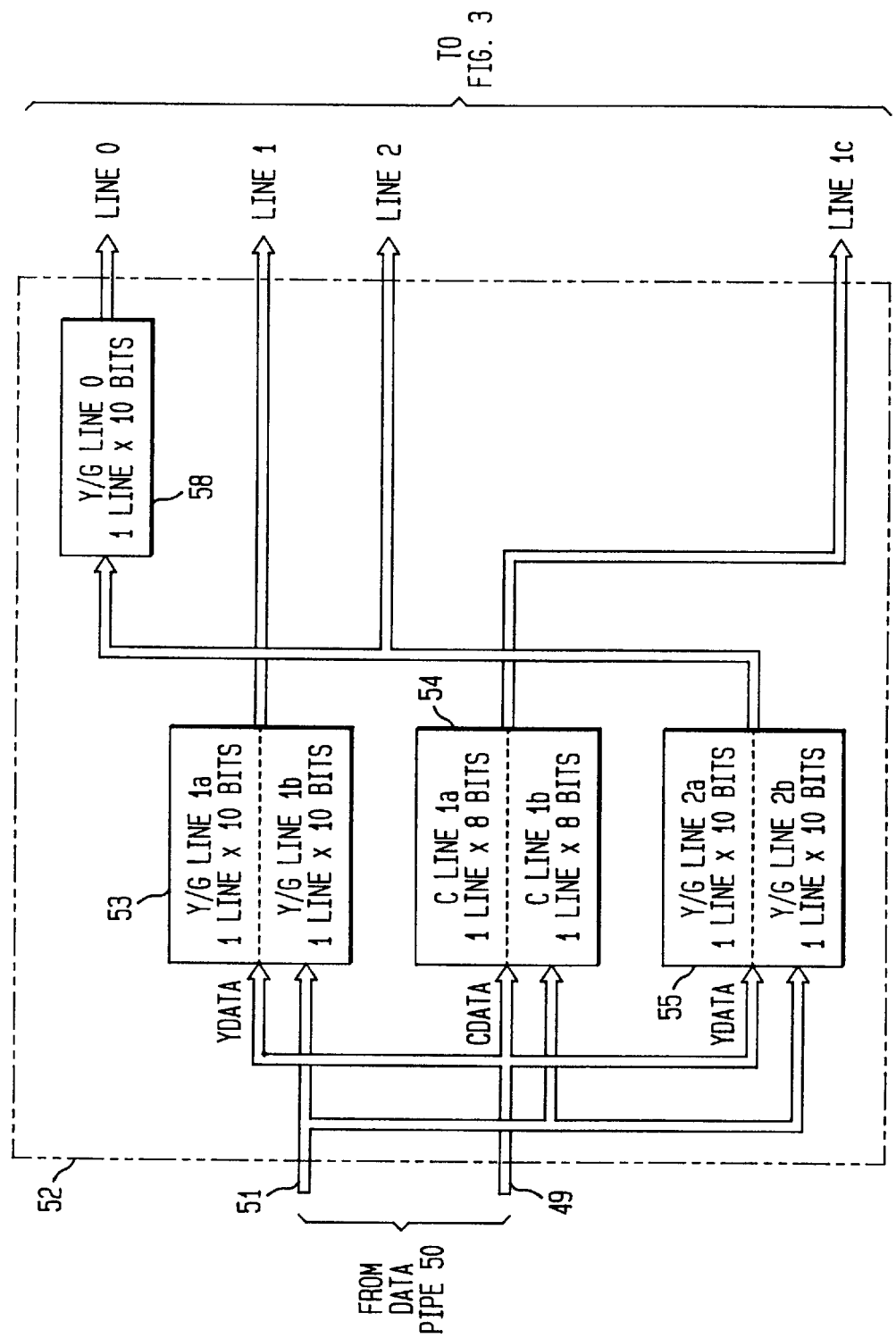
FIG. 4 is a block diagram of an exemplary Pixel Assembly Buffer forming part of a first portion of the Video Processing Circuitry shown in FIG. 2.

Referring now to FIG. 4, there is shown a block diagram of a Pixel Assembly Buffer 52 in accordance with the present invention. The Pixel Assembly Buffer 52 comprises first, second, and third double line buffers 53, 54, and 55, respectively, and a Y/G Line 0 buffer 58. The first double line buffer 53 is used for storing Y/G (luminance) line 1a data and Y/G line 1b data for first and second lines of a first field of a sprite picture received via a bus 49 from the Data Pipe 50. The line luminance data comprises 10 bits (bits 9–0) of data and control for each pixel of a line. The second double line buffer 54 is used for storing C (chrominance) Line 1a and C Line 1b data of the first and second lines of the first field of the sprite picture received via the bus 49 from the Data Pipe 50. The line chrominance data comprises 8 bits (bits 7–0) of data for each pixel of a line. The third double line buffer 55 is used for storing Y/G (luminance) line 2a data and Y/G line 2b data of first and second lines of a second field of a sprite picture received via the bus 49 from the Data Pipe 50. The line luminance data comprises 10 bits (bits 9–0) of data and control for each pixel of a line. Addresses for storing the received pixel data in each of the first, second, and third double line buffers 53, 54, and 55, respectively, are received over a bus 49 from the Data Pipe 50.

It is to be understood that the Lines 1a and 2a of the first and third double line buffers 53 and 55 store first and second horizontal lines of pixel data, respectively, where the first and second horizontal lines are adjacent lines within separate fields of the sprite picture in an interlaced display format. Similarly, Lines 1b and 2b of the first and third double line buffers 53 and 55 store third and fourth horizontal lines of pixel data, respectively, where the third and fourth horizontal lines are adjacent lines within separate fields of the sprite picture in an interlaced display format. In other words, the first and third double line buffers 53 and 55 sequentially store luminance data and control for, for example, pixels of a pair of odd and even lines, respectively, of respective first and second fields, or vice versa, of the sprite picture during a scanning of an interlaced display format. The second double line buffer 54 stores the chrominance data for the data of lines stored in the double line buffer 53. A chrominance double line buffer (not shown) similar to double line buffer 54 can be provided for double line buffer 55, but it is not necessary for reasons of economy and unimportance in a Convolver that will be explained hereinafter.

The output data from the first double line buffer 53 comprises ten bits of luminance data and control for each pixel of the lines stored therein which is outputted in parallel for each pixel over a bus designated LINE 1 to circuitry in FIG. 3. The output data from the second double line buffer 54 comprises eight bits of chrominance data for each pixel of the lines stored therein which is outputted in parallel for each pixel over a bus designated LINE 1c to circuitry in FIG. 3. The output data from the third double line buffer 55 comprises ten bits of luminance data and control for each pixel of the lines stored therein which is outputted in parallel for each pixel over a bus designated LINE 2 to circuitry in FIG. 3 and to the Y/G Line 0 Buffer 58. The Y/G Line 0 Buffer 58 functions to delay the line data and control outputted by the third double line buffer 55 by one horizontal line period to provide a delayed line output comprising ten bits of luminance data and control for each pixel of the line stored therein which is outputted in parallel over a bus designated LINE 0 to circuitry in FIG. 3. It is to be understood that at a sampling rate of 13.5 MHz for the NTSC standard television display, there are 858 pixels per line of the picture of which only about 704 pixels are actually displayed, and that there are 525 horizontal lines of pixels in two fields of a picture of which about 440–500 lines are normally seen depending on the television receiver used.

An exemplary sequence of operation for the first and third double line buffers 53 and 55, respectively, and the Y/G Line 0 Buffer 58 of the Pixel Assembly Buffer 52 is described in a copending Patent Application entitled "Apparatus Using Memory Control Tables Related To Video Graphics Processing For TV Receivers", Ser. No. 08/523,394 (Butler et al.), filed on the same date as the present application.

More particularly, during initialization steps, pixel data for a horizontal line 1 of a first field and pixel data for a horizontal line 2 of a second field are inputted to the Y/G line 1a portion of the first double line buffer 53 and the Y/G line 2a portion of the third double line buffer 55, respectively, during a first horizontal line period. Concurrent therewith, the pixel data for horizontal lines previously stored in the Y/G line 1b portion of the first double line buffer 53 and the Y/G line 2b portion of the third double line buffer 55, respectively, (no data presently stored therein) are read out on their respective output LINES 1 and 2. Concurrent therewith, the pixel data for the horizontal line previously stored in the Y/G line 2b portion of the third double line buffer 55 (no data previously stored therein) is inputted to Y/G Line 0 Buffer 58 while the previously stored pixel data for a horizontal line (no valid data) is outputted on output LINE 0. Similarly, pixel data for a horizontal line 3 of a first field and pixel data for a horizontal line 4 of a second field are inputted to the Y/G line 1*b* portion of the first double line buffer 53 and the Y/G line 2*b* portion of the third double line buffer 55, respectively, during a second horizontal line period. Concurrent therewith, the pixel data for horizontal lines 1 and 2 previously stored in the Y/G line 1*a* portion of the first double line buffer 53 and the Y/G line 2*a* portion of the third double line buffer 55, respectively, are read out on their respective output LINES 1 and 2. Still further, the pixel data for the horizontal line 2 previously stored in the Y/G line 2*a* portion of the third double line buffer 55 is inputted to Y/G Line 0 Buffer 58 while the previously stored pixel data for a horizontal line (no valid data) is outputted on output LINE 0.

After initialization, pixel data for a horizontal line 5 of a first field and pixel data for a horizontal line 6 of a second field are inputted to the Y/G line 1*a* portion of the first double line buffer 53 and the Y/G line 2*a* portion of the third double line buffer 55, respectively, during a third horizontal line period. Concurrent therewith, the pixel data for the horizontal lines 3 and 4 are read out of Y/G line 1*b* portion of the first double line buffer 53 and the Y/G line 2*b* portion of the third double line buffer 55, respectively, on their respective output LINES 1 and 2. Still further, the pixel data for the horizontal line 4 from the Y/G line 2*b* portion of the third double line buffer 55 is inputted to Y/G Line 0 Buffer 58 while the previously stored pixel data for the horizontal line 2 data is outputted on output LINE 0. Therefore, the Buffers 58, 53, and 55 are outputting pixel data for the horizontal lines 2, 3, and 4, respectively, for a sprite on respective output LINES 0, 1, and 2 during the third horizontal line period, where the pixel data for the horizontal lines 2 and 4 are part of the second field and the pixel data for the horizontal line 3 is part of the first field of a sprite picture that were stored in the Graphics Memory 38. The process continues in a similar manner during subsequent horizontal line periods for pixel data for subsequent sequential horizontal lines.

Turning again back to FIG. 3, there is shown a block diagram of a second portion of a Video Processing Circuitry 46 found in the subscriber cable box unit 10 of FIG. 1 in accordance with the present invention. The second portion of the Video Processing Circuitry 46 comprises Color Palette circuitry 60, a YC to YUV Demultiplexer 62, a Multiplexer/Fader (MUX./FADER) 64, a 3:1 Multiplexer and Control (3:1 MUX. & CONT.) 66, and a Convolver 68. The 10-bit pixel data (bits 9:0) propagating on each of LINES 0, 1, 2 from the output of the Pixel Assembly Buffer 52 of FIG. 2 for corresponding pixels in three adjacent horizontal lines of a sprite picture are received at separate inputs of each of the Color Palette circuitry 60, the YC to YUV Demultiplexer 62 and the 3:1 Multiplexer and Control 66. More particularly, bits 7–0 of the parallel 10-bit/pixel output from the Pixel Assembly Buffer 52 for each of output LINES 0, 1, and 2 are received at the inputs of the Color Palette circuitry 60 and the YC to YUV Demultiplexer 62, while bits 9 and 8 of the parallel 10-bit/pixel output from the Pixel Assembly Buffer 52 for each of output LINES 0, 1, and 2 are received at the inputs of the 3:1 Multiplexer and Control 66. Additionally, the YC to YUV Demultiplexer 62 receives the chrominance data bits 7–0 outputted in parallel on output LINE 1*c* from the Pixel Assembly Buffer 52 since the chrominance data is only used when the sprite pixel data relates to a True Color sprite signal. More particularly, where sprite data is encoded as a color palette signal, the code itself defines the color, and chrominance data is not required as is needed with a true color video signal.

The Color Palette circuitry 60 functions to detect when the 8 bits (bits 7:0) of parallel received pixel data on each of output LINES 0, 1, and 2 represent separate codes for particular colors of a color palette, and to convert those color palette codes into an output signal on bus 61 representing a 24-bit YUV multiplexed color palette signal for three 8-bit pixel data received for those three lines. Color Palette circuitry 60 is a well known device, and any suitable circuit can be used therefor. The YC to YUV Demultiplexer 62 detects when 8 bits (bits 7:0) of parallel received data for pixels on each of the output LINES 0, 1, and 2 from the Pixel Assembly Buffer 52 represents true color data (e.g., a sprite obtained directly from a television picture), and also uses the 8-bit chrominance data obtained via output LINE 1*c* from the Pixel Assembly Buffer 52 to generate a 24-bit True Color YUV output signal for pixels of the three lines for transmission on bus 63.

The Multiplexer/Fader (MUX./FADER) 64 receives, at separate inputs thereof, each of the 24-bit color palette YUV data signals propagating on a bus 61 from the Color Palette circuitry 60, the 24-bit true color YUV data signals propagating on bus 63 from the YC to YUV Demultiplexer 62, and 24-bit YUV live video signals on a bus 59. The Multiplexer/Fader 64 is responsive to control signals on a lead 67 from the 3:1 Multiplexer and Control 66 to output one of the three input signals (24-bit color palette YUV, 24-bit true color YUV, or 24-bit live video YUV) received at the Multiplexer/Fader 64 during each pixel period as digitized YUv mixed output signals on a bus 65. More particularly, the 3:1 Multiplexer and Control 66 determines from the bits 9 and 8 received on the output LINES 0, 1, and 2 from the Pixel Assembly Buffer 52 whether the pixel data from the Pixel Assembly Buffer 52 on the output LINES 0, 1, and 2 represents color palette data, true color data, or data (nonvalid data) for a pixel that is not part of a sprite to be overlaid on a live video signal, and, therefore, the live video signal should be used for that pixel instead of the color palette or true color data received from the Pixel Assembly Buffer 52. As a result of such control information obtained from bits 9 and 8 of output LINES 0, 1, and 2 from the Pixel Assembly Buffer 52, the 3:1 Multiplexer and Control 66 sends control signals over the lead 67 to the Multiplexer/Fader 64 to select the correct input data for each pixel of a picture to be displayed on a remote NTSC or PAL television receiver (not shown). The Convolver 68 uses sequential sets of three pixel data values received in the signal from the Multiplexer/Fader 64 on bus 65 to provide an 8-bit weighted output signal for pixel data for a central pixel in a 3-by-3 matrix of corresponding pixels in three adjacent lines of a television picture or to provide the signal received from the Multiplexer/Fader 64 on bus 65 as a YUV output signal on bus 47 depending on control signals from the 3:1 Multiplexer and Control 66 over a lead 69.

Figure 5:
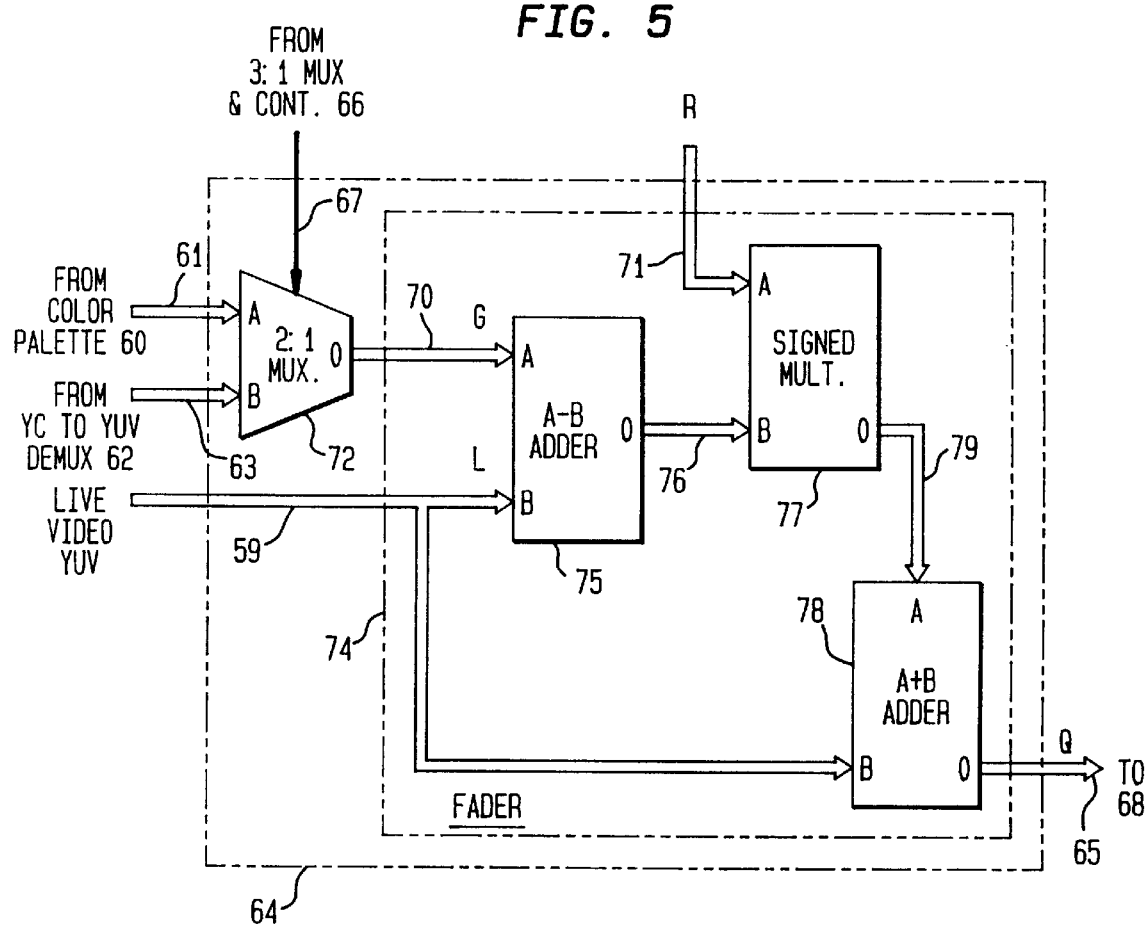
FIG. 5 is a block diagram of an exemplary Multiplexer/Fader forming part of a second portion of the Video Processing Circuitry shown in FIG. 3.

Referring now to FIG. 5, there is shown a block diagram of an exemplary Multiplexer/Fader circuit 64 (shown within a first dashed line rectangle) which comprises a 2:1 Multiplexer (MUX.) 72, and a Fader 74 (shown within a second dashed line rectangle). The Fader 74 comprises an A–B Adder 75, a Signed Multiplier (SIGNED MULT.) 77, and an A+B Adder 78. The 2:1 Multiplexer receives each of the Graphic data signals from the Color Palette 60 on bus 61 at a first input terminal (A), and the Graphic data signals from the YC to YUV Demultiplexer 62 on bus 63 at a second input terminal (B). A control signal on lead 67 from the 3:1 Multiplexer and Control 66 selects which of the two Graphic input signals (from input terminal A or B) will be output from the 2:1 Multiplexer 72 at output terminal (O). Pixel Graphic output signals (Y, U, or V) from an output terminal (O) of the 2:1 Multiplexer 72 (designated G) on a bus 70 are received at a first input terminal (A) of the A–B Adder 75. A live video YUV signal (Y, U, or V) (designated L) is received from a bus 59 at a second input terminal (B) of the A–B Adder 75. The pixel data values of the A terminal input data from the 2:1 Multiplexer 72 less the data values of the live video YUV pixel data received the B input terminal is provided as an output at an output terminal (O) of the A–B adder 75. The Signed Multiplier 77 receives from, for example, a register (not shown) a 9-bit selectively changeable ratio control value (R) on a bus 71 at a first input terminal (A), and the output from the A–B Adder 75 on a bus 76 at a second input terminal (B). The resultant multiplied value of the ratio control value (R) on the bus 71 and the Graphic signal output data from the A–B Adder 75 on the bus 76 is output at an output terminal (O) on a bus 79 to a first input terminal (A) of the A+B Adder 78. The live video signal (Y, U, or V) on bus 59 is received at a second input terminal (B) of A+B Adder 78, and the sum of the two input signal values are provided as a output signal (designated Q) on the bus 65 to a Convolver 68 (shown in FIG. 3).

The Fader 74 functions to fade a graphic signal for a sprite in or out so that the graphic does not appear or disappear instantaneously over the live video signal. In other words, for a graphic fade-in, the Fader 74 causes the graphic to appear with increasing intensity on a television receiver while the live video signal decreases in intensity in the area of the graphic over a short period of time so that the graphic is totally visible. Similarly, for a graphic fade-out, the Fader 74 causes the graphic to appear with decreasing intensity on a television receiver while the live video signal increases in intensity in the area of the graphic over a short period of time until the graphic disappears. The operation of the Fader 74 can be explained in accordance with the following algorithms. For the following, an exemplary 9-bit fade multiplier (R) provided on bus 71 is defined as follows. R is the fade control value and ranges from 0 to 256. From the above definitions, $$Q = [(R/256)*G] + [(1 - R/256)*L], \text{ and} \qquad \text{Eq. 2}$$
$$= L + [(G - L)*R]/256,$$

where "L" is a pixel value of the live video, "G" is a pixel value of the sprite overlay, and the symbol "*" represents a multiplying function. From Equation 2 above, as the ratio used for the multiplying value R changes, the intensity of the graphic and live video signals change in a opposite directions.

Figure 6:
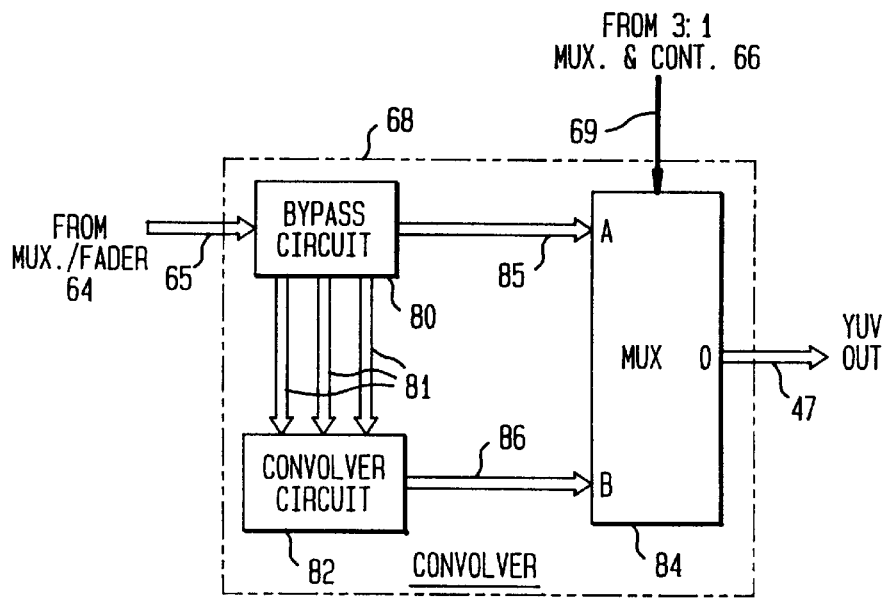
FIG. 6 is a block diagram of an exemplary arrangement of a Convolver forming part of the second portion of the Video Processing Circuitry shown in FIG. 3.

Referring now to FIG. 6, there is shown a block diagram of the Convolver 68 shown in FIG. 3. The Convolver 68 (shown within a dashed line rectangle) comprises a Bypass circuit 80, a convolver circuit 82, and a Multiplexer (MUX.) 84. The Bypass circuit 80 receives sequential pixel data from the Multiplexer/Fader 64 (shown in FIGS. 3 and 5) on bus 65, and concurrently generates therefrom data on buses 81 for three pixels in a vertical of a sprite to be displayed on a television receiver. More particularly, the three pixels are obtained from corresponding pixels in three adjacent lines of both fields of a frame making up a sprite picture. The three pixel data values are obtained by any suitable arrangement such as a plurality of delay circuits operating from a pixel clock or a three times pixel clock. The three pixel data values are received via buses 81 by the Convolver circuit 82. The sequential pixel data from the Multiplexer/Fader 64 is received by the Bypass circuit 80 on the bus 65. The sequential pixel data from the Multiplexer/Fader 64 passes through the Bypass circuit 80 and is provided to a first input (A) of the Multiplexer 84 via a bus 85. Still further, the Bypass circuit 80 transmits sequential sets of three pixel data values from separate outputs thereof to separate inputs of Convolver circuit 82 on buses 81. The Convolver circuit 82 provides an 8-bit weighted output signal for pixel data for a central pixel in a 3-by-3 matrix of corresponding pixels in three adjacent lines of a television picture at an output thereof to a second input (B) of the Multiplexer 84 via a bus 86. The Multiplexer 84 selects the signals at the first (A) or second (B) inputs for transmission to the output terminal (O) and on bus 47 depending on control signals from the 3:1 Multiplexer and Control 66 over a lead 69.

As is disclosed in the copending U.S. patent application Ser. No. 08/523,395 (GID872), filed concurrently with the present Patent application for the same inventors and assignee as the present application, and is incorporated herein by reference, the Convolver circuit 82 effectively multiplies (using just adders and delays) the three pixels of a vertical received on buses 81 in a 3-by-3 matrix of pixels with predetermined weight values, and provides an averaged output signal for the central pixel of the 3-by-3 matrix to a second input (B) of the Multiplexer 84. This process continues for each pixel of a central row (output LINE 1 of the Pixel Assembly Buffer 52 of FIG. 2) as the sprite data for the corresponding pixels of the three adjacent lines as the pixel data progresses (shifts) horizontally across the sprite picture for three adjacent lines.

Figure 7:
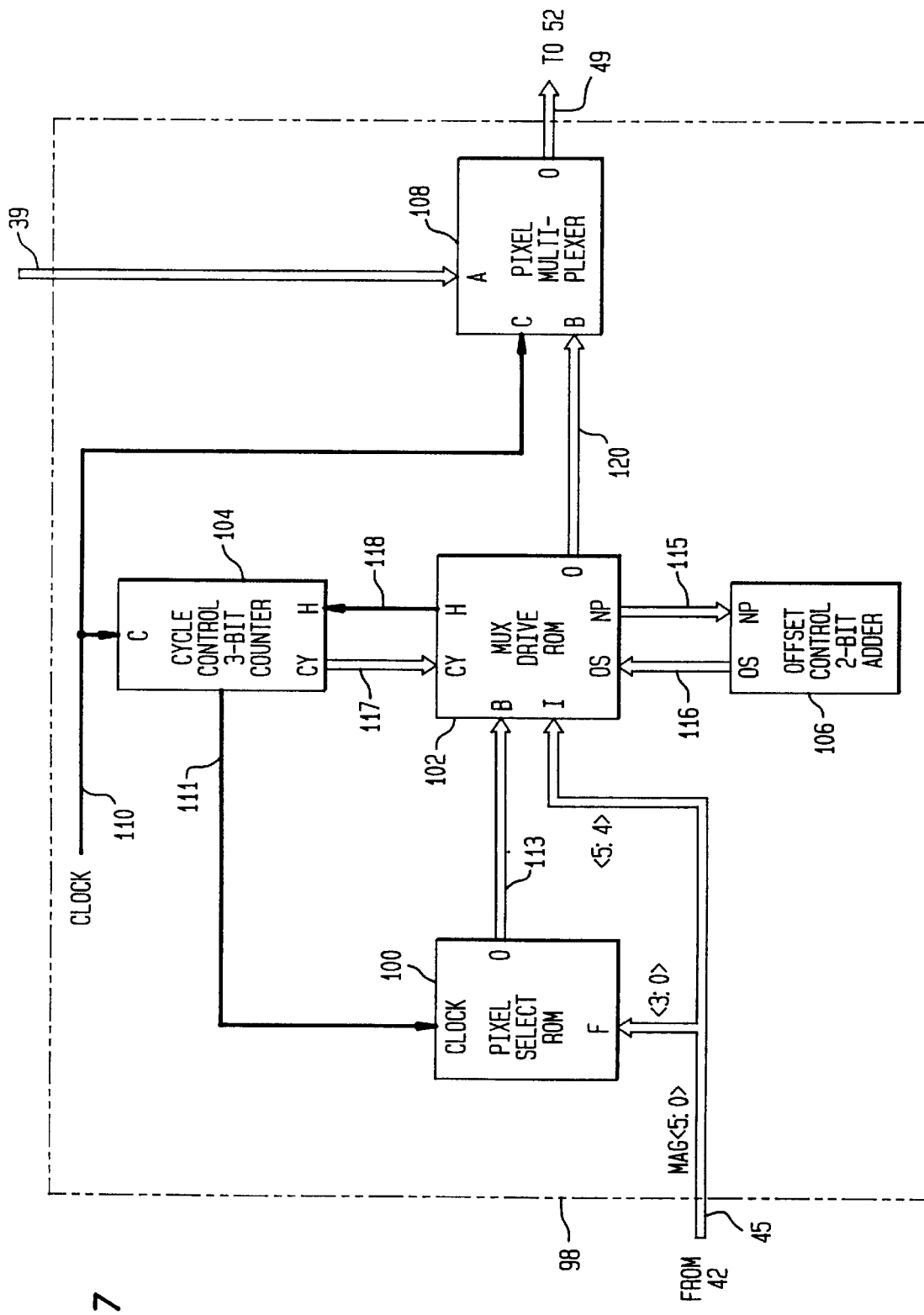
FIG. 7 is a block diagram of a Pixel Buffer Data Pipe and Magnification Circuit forming part of the first portion of the Video Processing Circuitry shown in FIG. 2 in accordance with the present invention.

Referring now to FIG. 7, there is shown a block diagram of a Pixel Buffer Data Pipe and Magnification Circuit 98 forming part of the Data Pipe 50 shown in FIG. 2 for providing selective magnifications in a horizontal direction for graphics (sprites) in accordance with the present invention. The Pixel Buffer Data Pipe and Magnification Circuit 98 (also referred to as a second magnification modifying means) comprises a Pixel Select Read Only Memory (PIXEL SELECT ROM) 100, a Multiplexer Drive Read Only Memory (MUX DRIVE ROM) 102, a Cycle Control 3-Bit Counter 104 (also referred to as a cycle control means), an Offset Control 2-Bit Adder 106 (also referred to as an offset control means), and a Pixel Multiplexer 108 (also referred to as a pixel multiplexing means). A bus 45 provides control data that is obtained from a Graphics Memory 38 (shown in FIG. 2) via a Memory Controller and Sprite State Machine 42 (shown in FIG. 2) as (a) a 4-bit horizontal Fractional Magnifier control signal to an F input terminal of the Pixel Select Read Only Memory (ROM) 100, and (b) a 2-bit Integer Magnification control signal to an I input terminal of the Multiplexer Drive ROM 102. A Bus 39 provides a 32-bit pixel data signal including four 8-bit incoming graphic pixels to an A input terminal of the Pixel Multiplexer 108. The Pixel Select ROM 100 also receives a clock signal at a CLOCK input terminal from the Cycle Control 3-Bit Counter 104 via a conductor 111, and outputs a 4-bit pixel select control signal from an output terminal O to an input terminal B of the Multiplexer Drive ROM 102 via a bus 113. The Cycle Control 3-Bit Counter 104 receives a clock signal at an input terminal C via a conductor 110 and provides the clock signal to the Pixel Select ROM 100 via the conductor 111. Still further, the Cycle Control 3-Bit Counter 104 selectively receives a "Hold" control signal from the Multiplexer Drive ROM 102 at an H input terminal via a conductor 118, and selectively transmits a 3-bit "Cycle" control signal from a CY output terminal to a CY input terminal of the Multiplexer Drive ROM 102 via a bus 117. The Multiplexer Drive ROM 102 selectively transmits 2-bit "No. Pixel" control signals from an output terminal NP to an input terminal NP of the Offset Control 2-Bit Adder 106 via a bus 115, Still further, the Multiplexer Drive ROM 102 receives 2-bit "Offset" control signals at an input terminal OS that are sent from an OS output terminal of the Offset Control 2-Bit Adder 106 via a bus 116. Additionally, the Multiplexer Drive ROM 102 outputs 16-bit control signals from an output terminal O via a bus 120 to an input terminal B of the Pixel Multiplexer 108. The Pixel Multiplexer 108 receives the Clock signal at an input terminal C via the conductor 110, and outputs 32-bit words including four 8-bit outgoing graphic pixels from an output terminal O for transmission to the Pixel Assembly Buffer 52 via a bus 49.

The Pixel Buffer Data Pipe and Magnification Circuit 98 permits a shrinking or magnification of video data during a transfer from the Graphics Memory 38 into the Pixel Assembly Buffer 52 and then a subsequent transfer to a television screen. The magnification range of the Pixel Buffer Data Pipe and Magnification Circuit 98 has a preferred range of from one sixteenth up to four times normal size in steps of one sixteenth. In other words, one half, five sixteenths, and one and three sixteenths are all valid magnifications. It is to be understood that the preferred range mentioned above can be expanded or decreased as desired, and that the Pixel Buffer Data Pipe and Magnification Circuit 98 post processes the pixel data after it leaves the Graphics Memory 38 and does not affect the contents of the Graphics Memory 38. Therefore, a dynamic zoom is possible by the Memory Controller and Sprite State Machine 42 changing a magnification control word comprising a 4-bit Fractional Magnification control signal and a 2-bit Integer Magnification control signal without needing to touch or affect a stored image in the Graphics Memory 38. In its simple form, all the Pixel Buffer Data Pipe and Magnification Circuit 98 does is to drop or repeat pixels or lines in a ratio consistent with a required magnification.

Under normal circumstances, a dropping of pixels can produce unacceptable video artifacts on a television screen since the pixel color and luminance transitions can exceed the normal bandwidth limits of the television system. More particularly, the maximum bandwidth that a television can display is 4 MHz. For example, a transition from black to white is normally carried out over about three pixels at typical sampling rates because a luminance change cannot be made with lesser pixels within the bandwidth of the television system. Therefore, if a middle two pixels of a transition are dropped, a black to white transition would effectively exist that is considerably faster than permitted in the 4 MHz bandwidth specification of the television system. This produces a "zippering" line effect along the edges or transitions. Very abrupt transitions can also be obtained when two sprites are placed on top of or overlap each other, because it is not immediately known what the two colors might be in immediately adjacent pixels. The same thing occurs if pixels are removed or deleted in the Pixel Buffer Data Pipe and Magnification Circuit 98 in overlapping sprites to cause a very abrupt video transition. Therefore, to avoid the artifacts that are produced, a reduction of the bandwidth because of the adjacency of the sprites must be taken care of. The convolver 68 (shown in FIGS. 3 and 6) is provided to filter the edges of sprites by reducing the bandwidth of abrupt transitions in its frequency limiting capacity. Because the two dimensional convolver 68 "smooths out" the artifacts that would be visible from the dropping of pixels, a significant reduction in the logic of the Pixel Buffer Data Pipe and Magnification Circuit 98 is possible. Effectively, the burden of the work is implemented in the Pixel Select ROM 100 and the Multiplexer Drive ROM 102 which are small ROMs. The above description indicates that pixels are simply dropped or repeated in a horizontal direction. Although this is correct in principle, it must be understood that pixel data can be stored in 8-bit color palettized (256 colors) or 16-bit YCrCb (YUV) formats and are packed in a 32-bit wide Graphics Memory 38 for improved transfer bandwidth.

For magnifications less than unity and in the range of from $1/16$ to $15/16$, different numbers of pixels are dropped from transfers between pixels of a subgroup of 4 incoming pixels and pixels of a subgroup of 4 outgoing pixels, and such transfers are performed on an overall group of 16 pixels. Table 1 shown hereinbelow is coded and stored in the Pixel Select ROM 100 to provide an even as possible selection for one sixteenth magnification steps in order to provide improved picture quality at the television receiver. A "1" in a column of Table 1 indicates that the pixel is used and a "0" in a column indicates that the pixel is dropped or not transferred to one of the outgoing group of pixels. For example, only pixel 0 is used for a $1/16$ magnification, only pixels 0, 5, and 10 are used for a $3/16$ magnification, and only pixels 0, 4, 8, and 12 are used for a $4/16$ magnification. Therefore, the Pixel Select ROM 100 is only 256 bits in total and is very small.

TABLE 1

| SELECTED PIXELS | |
|---|---|
| 15 -------- 0 | SIXTEENTH |
| 0000 0000 0000 0000 | 0 |
| 0000 0000 0000 0001 | 1 |
| 0000 0001 0000 0001 | 2 |
| 0000 0100 0010 0001 | 3 |
| 0001 0001 0001 0001 | 4 |
| 0001 0010 0100 1001 | 5 |
| 0010 0101 0010 0101 | 6 |
| 0010 1001 0101 0101 | 7 |
| 0101 0101 0101 0101 | 8 |
| 0101 0101 1001 1011 | 9 |
| 0101 1011 0101 1011 | 10 |
| 0110 1101 1011 0111 | 11 |
| 0111 0111 0111 0111 | 12 |
| 0111 1011 1101 1111 | 13 |
| 0111 1111 0111 1111 | 14 |
| 0111 1111 1111 1111 | 15 |

In operation, a 4-bit horizontal Fractional Magnification control word is received at the F input terminal of the Pixel Select ROM 100 via the bus 45. This 4-bit horizontal Fractional Magnification control word is used to enter the Table 1 above and obtain the proper 4-bit control word (for each of pixels 0–3, 4–7, 8–11, or 12–15) to be transmitted via bus 113 to the Multiplexer Drive ROM 102 at any instant of time. A two-bit binary counter exists in the Pixel Select ROM 100 which sequentially selects one of the four sets of 4-bit selected pixels at each magnification level. This counter sequentially counts up upon each clock input from the bus 111. For example, for a magnification of $8/16$, the received 4-bit horizontal Fractional Magnification control word is a binary 1000 (decimal 8), and the transmitted 4-bit control word for each of the four pixels 0–3, 4–7, 8–11, and 12–15 is coded as a binary 0101 to provide 8 "1s" in the 16 bits. Each 4-bit control word is received at the B input terminal of the Multiplexer Drive ROM 102 for use inter alia with the Integer Magnification control signal received at the I input terminal via bus 45 to generate a 16-bit control word that is transmitted from the O output terminal to the B input terminal of the Pixel Multiplexer 108 via the bus 120.

For magnifications greater than unity, predetermined pixels are transmitted more than once to provide an expansion feature. More particularly, in the magnification range of from 1 to 1 and $15/16$, all pixels are transmitted once, and certain pixels are transmitted a second time as indicated in Table 1 for any fractional magnification portion used. For example, for a magnification of 1 and three sixteenths, all pixels are transmitted once (for the magnification of 1) and pixels 0, 5, and 10 are transmitted a second time (for a 3/16 magnification). Similarly, for a magnification range of from 2 to 2 and 15/16, each pixel is transmitted twice for the integer portion of the magnification, and certain pixels are transmitted a third time as indicated in Table 1 for any fractional portion of the magnification. Still further, for a magnification range from 3 to 3 and 15/16, each pixel is transmitted at least three times with a fourth pixel transmission depending on any fractional part of the magnification as shown in Table 1.

Figure 8:
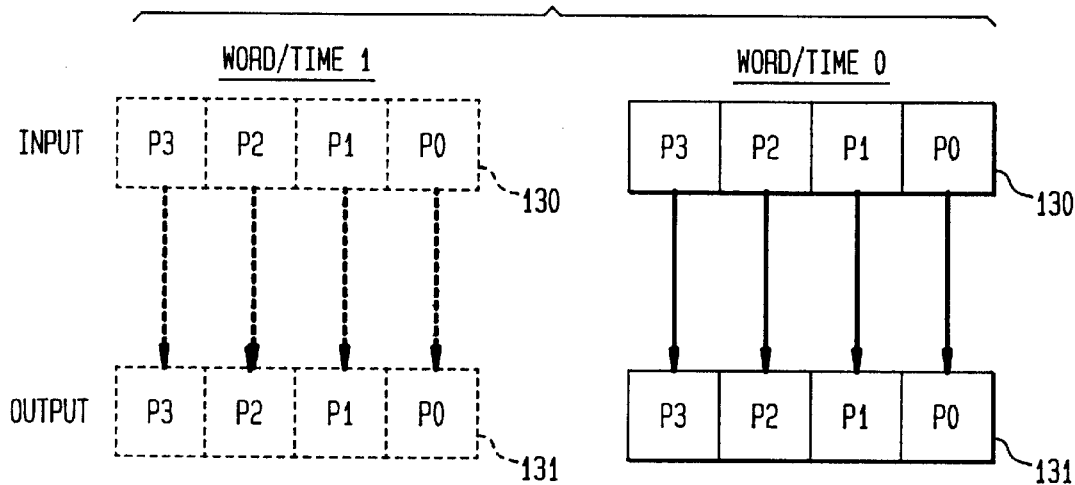
FIG. 8 shows a transfer of pixels between a 32-bit input buffer and a 32-bit output buffer during a first Word/Time 0 cycle and a second Word/Time 1 cycle within a Pixel Multiplexer shown in FIG. 7 for a magnification of one in accordance with the present invention.
Figure 9:
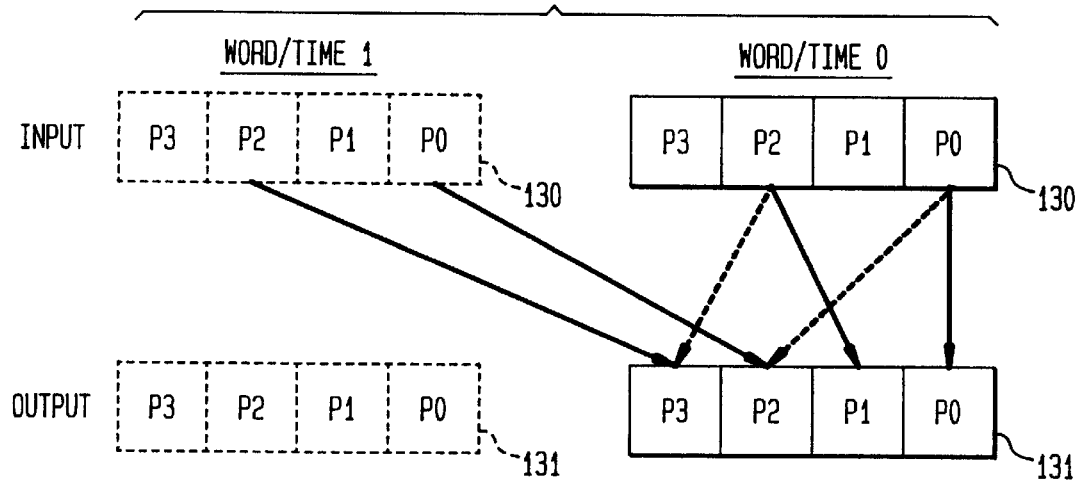
FIG. 9 shows a transfer of pixels between a 32-bit input buffer and a 32-bit output buffer during a first Word/Time 0 cycle and a second Word/Time 1 cycle within a Pixel Multiplexer shown in FIG. 7 for a magnification of one half in accordance with the present invention.
Figure 10:
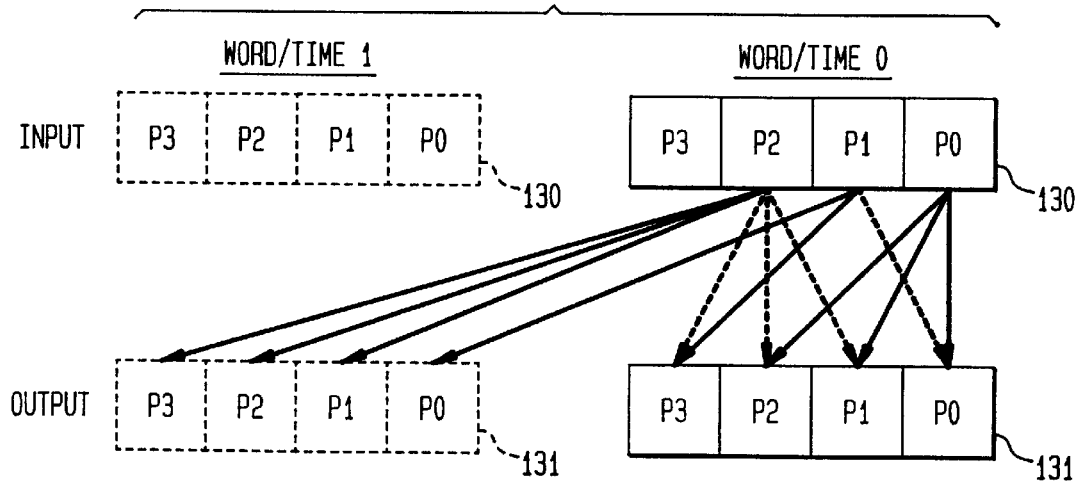
FIG. 10 shows a transfer of pixels between a 32-bit input buffer and a 32-bit output buffer during a first Word/Time 0 cycle and a second Word/Time 1 cycle within a Pixel Multiplexer shown in FIG. 7 for a magnification of two and one half in accordance with the present invention.

Referring now to FIGS. 8, 9, and 10, there is shown a transfer of four pixels between a 32-bit input buffer 130 and a 32-bit output buffer 131 during a first Word/Time 0 cycle and a second Word/Time 1 cycle within the Pixel Multiplexer 108 (shown in FIG. 7) for a magnification of 1, one half, and two and one half, respectively. It is to be understood that the Pixel Multiplexer 108 only comprises a single input buffer 130 and a single output buffer 131, and that the buffers 130 and 131 are used during each subsequent cycle for effecting multiplexing transfers. As is shown in FIG. 8, for a magnification of 1, without any fractional magnification, all pixels are used only once. Therefore, for example, data for four 8-bit pixels 0, 1, 2, and 3 are inputted into the pixel locations P0, P1, P2, and P3, respectively, in the input buffer 130 via bus 39 (shown in FIG. 7) during a Word/Time 0 cycle. The Pixel Multiplexer 108 is responsive to the 16-bit control signal on Bus 120 from the Multiplexer Drive ROM 102 (shown in FIG. 7) to cause pixels 0, 1, 2, and 3 to be transferred (multiplexed) directly into pixel locations P0, P1, P2, and P3, respectively, in the output buffer 131. Once the output buffer 131 is filled, the 32-bits of data for the four pixels stored therein are transmitted to the Pixel Assembly Buffer 52 (shown in FIG. 2) via the bus 51 and the output buffer 131 is ready for four subsequent transfers.

Similarly, during a next Word/Time 1 cycle, a next four 8-bit pixels 4, 5, 6, and 7 are inputted into the pixel locations P0, P1, P2, and P3, respectively, in the input buffer 130 via bus 39, and are transferred directly into pixel locations P0, P1, P2, and P3, respectively, in the output buffer 131 and transmitted to the Pixel Assembly Buffer 52. This process continues for the remaining eight pixels (pixels 8–15) of a 16 pixel group during a Word/Time 2 cycle and a word/Time 3 cycle to complete a pixel transmission of sixteen pixels received in sets of 4 pixels from the Graphics Memory 38 (shown in FIG. 2) via the Memory Controller and Sprite State Machine 42 (shown in FIG. 2) to the Pixel Assembly Buffer 52.

Referring now to FIG. 9, there is shown pixel transfers for a magnification of one half during Word/Time 0 and Word/Time 1 cycles. Since the desired magnification is less than unity, the only pixels that are used are those indicated with a "1" in Table 1, which for a magnification of 8/16 are pixels 0, 2, 4, 6, 8, 10, 12, and 14. Therefore, during a Word/Time 0 cycle, data for pixels 0, 1, 2, and 3 of a sixteen pixel group are inputted into pixels locations P0, P1, P2, and P3, respectively, of the input buffer 130. The Pixel Multiplexer 108 is responsive to the 16-bit control signal on Bus 120 from the Multiplexer Drive ROM 102 (shown in FIG. 7) to cause pixels 0 and 2 to be transferred into pixel locations P0 and P1, respectively, in the output buffer 131 during the Word/Time 0 cycle. During the next Word/Time 1 cycle, a next four 8-bit pixels 4, 5, 6, and 7 of the 16 pixel group are inputted into the pixel locations P0, P1, P2, and P3, respectively, in the input buffer 130 via bus 39, and pixels 4 (location P0) and 6 (location P2) are transferred into pixel locations P2, and P3, respectively, in the output buffer 131. This latter transfer of pixels 4 and 6 is also shown by the dashed lines in the Word/Time 0 cycle as it actually happens between the single input and output buffers 130 and 131, respectively, during the Word/Time 1 cycle. With the output buffer 131 filled, the 32-bits of data for the four input pixels (0, 2, 4, and 6) stored therein are transferred out to the Pixel Assembly Buffer 52 (shown in FIG. 2) via the bus 51 during the Word/Time 1 cycle. This process continues in a corresponding manner for the remaining eight pixels (pixels 8–11 and 12–15) of the sixteen pixel group during a Word/Time 2 cycle and a word/Time 3 cycle to complete a pixel transmission of the received pixels 0, 2, 4, 6, 8, 10, 12, and 14 to the Pixel Assembly Buffer 52 for the desired magnification of one half.

Referring now to FIG. 10, there is shown pixel transfers for a magnification of two and one half during Word/Time 0 and Word/Time 1 cycles. With the desired magnification of the integer two, each pixel is used twice, and for the fractional magnification value of one half (8/16), the only pixels that are used a third time are the pixels indicated with a "1" in Table 1, which for a magnification of 8/16 are pixels 0, 2, 4, 6, 8, 10, 12, and 14. Where a pixel is used more than once, it is transferred into immediately adjacent pixel locations of the output buffer 131. Therefore, during a Word/Time 0 cycle, data for pixels 0, 1, 2, and 3 of a 16 pixel group are inputted into pixels locations P0, P1, P2, and P3, respectively, of the input buffer 130. The Pixel Multiplexer 108 is responsive to the 16-bit control signal on Bus 120 from the Multiplexer Drive ROM 102 (shown in FIG. 7) to cause pixel 0 to be transferred into pixel locations P0 and P1 of the output buffer 131 during the Word/Time 0 cycle for the integer magnification of two, and the pixel 0 to also be transferred to pixel location P2 of the output buffer 131 for the magnification portion of one half. Therefore. pixel 0 is used three times. Still further, the pixel 1 in pixel location P1 is also transferred into pixel location P3 in the output buffer 131 during the Word/Time 0 cycle. With the output buffer 131 filled with data for four pixels, the 32-bit word is outputted via bus 51 to the Pixel Assembly Buffer 52 and the output buffer 131 is ready to accept more transfers. During the next Word/Time 1 cycle, the data for pixels 0–3 already present in the input buffer 130 are used because only a portion of the pixels were transferred during the Word/Time 0 cycle. More particularly, the data for pixel 1 in input pixel location P1 in input buffer 130 is transferred into pixel location P0 in the output buffer 131 to complete the use of pixel 1 twice for the magnification value portion of 2. Since pixel 1 is not used for a magnification of 8/16, the transfers of input pixel 1 is complete. Since the input pixel 2 is used three times for a magnification of 2 and one half, the pixel 2 in pixel location P2 of the input buffer 130 is transferred into each of pixel locations P1–P3 of the output buffer 131. With the output buffer 131 again filled with data for four pixels, the 32-bit word is outputted via bus 51 to the Pixel Assembly Buffer 52. The transfer of pixels locations P1 and P2 that actually occur during Word/Time 1 is depicted with dashed lines in the Word/Time 0 cycle since only one input and output buffer 130 and 131, respectively, are actually present. This process continues for using the already stored input pixel location P3 twice, plus using each of the other twelve pixels (pixels 4–15) of the sixteen pixel group either two or three times during subsequent Word/Time cycles to properly transfer each of the pixels 3–15 making up a group of 16 pixels.

Returning now to FIG. 7, the Multiplexer Drive ROM 102 receives (a) the integer portion of the magnification value via bus 45, (b) a control signal indicating which pixels to use in each 4-pixel group for the fractional portion of the magnification value from the Pixel Select ROM 100 via bus 113, (c) a 2-bit control signal from the Offset Control 2-Bit Adder 106 defining a word alignment (offset) via bus 116, and (d) a 3-bit control signal from the Cycle Control 3-Bit Adder 104 via bus 117. From these input signals, the Multiplexer Drive ROM 102 generates a 16-bit output signal for transmission to the Pixel Multiplexer 108 via the bus 120. The Multiplexer Drive ROM 102 stores a sequence of 16-bit ROM Codes which each define a separate desired integer and/or fractional magnification, a word alignment (offset), and a Word/Time cycle, where one of the ROM codes is outputted as a 16-bit control word to the Pixel Multiplexer 108 during each Word/Time cycle.

Referring now to FIGS. 11 and 12, there is shown a first and middle page, respectively, of a multi-page 3.5 Megabyte Excel spreadsheet that describes the operation of the Multiplexer Drive ROM 102. The spreadsheet comprises four columns labeled "Input Code" which indicate codes for (a) a 2-bit "Integer" code for an integer magnification code representing a 0, 1, 2, or 3 integer magnification that is received via bus 45, (b) a 2-bit "Offset" code representing a 0, 1, 2, or 3 offset that is received from the Offset Control 2-Bit Adder 106 via bus 116, (c) a 4-bit "Select" code representing a fractional magnification value in one-sixteenth steps in the range of from 0 to $^{15}/_{16}$ that is received from the Pixel Select ROM 100 via bus 113, and (d) a 3-bit "Cycle" code representing one of 0, 1, 2, 3, 4, 5, 6, or 7 Word/Time cycles that is received from the Cycle Control 3-Bit Adder 104 via bus 117. For example, on the line designated 135 in FIG. 12, the "Integer" binary code of 10 indicates a decimal magnification of 2, the "Offset" binary code of 11 indicates an offset of 3 counts, the "Select" binary code of 0000 indicates a fractional magnification of 0, and the "Cycle" binary code of 000 indicates a Word/Time cycle of 0. In other words, line 135 is used when the input signals indicate a magnification of exactly 2.0 during a Word/Time cycle 0 with an offset of 3 counts.

It is to be understood that a condition can exist where the output buffer 131 (shown in FIGS. 8–10) may not be completely empty after the transfer of four pixels of a first 4-pixel word is complete and a second 32-bit input word for four pixels is received on a bus 39. This may require a skewing of a pixel in the second input word that is located in a particular pixel location of the input buffer 130 (shown in FIGS. 8–10) to a different pixel location in the output buffer 131 when the previous transfers had not filled the output buffer 131. Therefore, an input pixel in pixel location P0 of the input buffer 130 is (a) transferred directly into the pixel location P0 of the output buffer 131 for an offset of 0, (b) transferred into the pixel location P1 of the output buffer 131 for an offset of 1, (c) transferred into the pixel location P2 of the output buffer 131 for an offset of 2, and (d) transferred into the pixel location P3 of the output buffer 131 for an offset of 3. More particularly, line 135 of FIG. 12 would be used for input signals indicating a magnification of exactly 2.0 during a Word/Time cycle 0 with an offset of 3 counts. In other words, the Offset code is used to slide the input pixel in the input buffer 130 into an indicated output pixel location in the output buffer 131. Therefore, the four input signals determine which line of the spreadsheet is used to generate a 16-bit output signal (shown in the ROM Code column) that is transmitted by the Multiplexer Drive ROM 102 to the Pixel Multiplexer 108 (shown in FIG. 7) via the bus 120. Once a line (e.g., line 135 or 138 in FIG. 12) of the spreadsheet for a particular magnification, offset, and Word/Time cycle of 000 is used for the start of transfers for a 4-pixel group, the subsequent lines (e.g., lines 136–137 or 139–140) of the spreadsheet are used for subsequent cycles until the 4-pixel transfer is complete.

In the center of the spreadsheet are shown 16 Multiplexer connections [Mux Connections (from-to)] columns that indicate which input pixel in the input buffer 130 is transferred to which output pixel location in the output buffer 131 during a Word/Time cycle. The line immediately under the Mux Connections (from-to) title shows four 0s, four 1s, four 2s, and four 3s in succession from right-to-left, where a 0, 1, 2, or 3 represents an incoming pixel 0, 1, 2, or 3, respectively, in the input buffer 130. The next line therebelow, shows four groups of 0, 1, 2, and 3 in succession from right-to-left where a 0, 1, 2, or 3 represents an outgoing pixel 0, 1, 2, or 3, respectively, in the output buffer 131. More particularly, in line 135 in FIG. 12, a single "1" is shown in the Mux Connections column that indicates that a transfer of the incoming pixel 0 in the input buffer 130 to the outgoing pixel 3 in the output buffer 131 is made during a cycle 0 with an offset of 3. Such transfer fills the output buffer 131 which stored previously transferred pixels in pixel locations P0–P2, and the stored pixel data in the output buffer 131 is transmitted to the Pixel Assembly Buffer 52 via the bus 49. Thus far incoming pixel 0 has only been used once in the Word/Time cycle 0 for the magnification of 2.

During the next cycle 1 shown on line 136 of FIG. 12, the "1s" in the Mux Connections columns indicate that the incoming pixel 0 is transferred to the output pixel 0 to complete the use of incoming pixel 0 for the magnification of 2, the incoming pixel 1 is transferred to the outgoing pixels 1 and 2 to complete the dual use of incoming pixel 1, and the incoming pixel 2 is transferred to the outgoing pixel 3. Such transfer fills the output buffer 131, and the stored data in the output buffer 131 is transmitted to the Pixel Assembly Buffer 52 via the bus 51. During the next cycle 2 shown on line 137 of FIG. 12, the "1s" in the Mux Connections columns indicate that the incoming pixel 2 is transferred to the output pixel 0 to complete the use of incoming pixel 2 for the magnification of 2, and the incoming pixel 3 is transferred to the outgoing pixels 1 and 2 to complete the dual use of incoming pixel 3. This completes the transfer of the pixels 0–3 stored in the input buffer 130 for parameters of a magnification of 2 with an offset of 3 which took 3 cycles to complete instead of only 2 cycles because of the initial offset of 3. Since the output buffer 131 still has room for another pixel in outgoing pixel 3 of the output buffer 131, the outgoing pixel 3 will be filled in a first transfer of a second 32-bit, 4-pixel, word that is received in the input buffer 130 via bus 45 using, for example, the lines 135–137 of FIG. 12 again or some other line in the spreadsheet with an offset of 3 and a cycle of 0, and a predetermined magnification. It is to be understood that in the spreadsheet, the output side can only accommodate a maximum of four pixels on any row, where the maximum of four pixels must be transferred into output pixel locations 0, 1, 2, and 3. This is true because in any one cycle no more than one pixel can be transferred into any one of the output pixel locations of the output buffer 131.

The left-hand column of the spreadsheet provides "ROM Codes" which are 16-bit codes that are outputted by the Multiplexer Drive ROM 102 during sequential Word/Time cycles. The Pixel Multiplexer 108 uses the ROM codes to cause desired pixel transfers of four pixels currently stored in a 32-bit pixel data word in the input buffer 130 to the output buffer 131. The 16-bit output control signal from the Multiplexer Drive ROM 102 also controls a latching of the outputs of the Pixel Multiplexer 108 into a final 32-bit output buffer as will be discussed in greater detail hereinafter. More particularly, the ROM Code on each line is merely a 16-bit code representing the binary version of the 16 Mux Connection columns of the spreadsheet. For example, the ROM Code on line 135 of FIG. 12 is shown as 0008 which is a hexidecimal code which from right-to-left represents a binary value for the 4-columns of the Mux Connections for incoming pixels 3333, 2222, 1111, and 0000, respectively. In other words, a "1000" in the four rightmost Mux Connections columns for the four incoming pixel 0 columns on line 135 represents a binary 8 which forms the rightmost hexadecimal code number of the 0008 ROM Code. Similarly, all other Mux Connections columns on line 135 are zeros for the four incoming pixel 1, 2, and 3 columns to provide the 000 hexidecimal codes forming the leftmost remainder of the 0008 ROM Code. The ROM Codes for each of the other rows of the spreadsheet can be determined in a same manner from the associated Mux Connections columns. It should be understood that a hexidecimal code goes from the letters A to F, where a "C" in a ROM Code indicates a binary 1100 (decimal 12), and an "E" indicates a binary 1110 (decimal 14). The letters A, B, C, D, E, and F can be found in certain positions of a ROM code to represent a decimal number 10, 11, 12, 13, 14, and 15, respectively.

A "Control Code" column and an "O/V" (Overflow) column in the spreadsheet indicate whether there is more to follow to complete a transfer of pixels in a four pixel 32-bit word or not. More particularly, the Control Code is a 2-bit code that is transmitted to the Offset Control 2-Bit Adder 106 (shown in FIG. 7) over the bus 115 to calculate the Offset value to be used. The Offset Control 2-Bit Adder 106 then transmits the determined 2-bit Offset code shown in the Offset Input Code column of the spreadsheet back to the Multiplexer Drive ROM 102 via bus 116. A "4" in the Control Code column effectively indicates that 4 pixels are now present in the output buffer 131 after the indicated pixel transfer(s). Therefore, in line 135 of FIG. 12, the transfer of the 0 incoming pixel to the 3 outgoing pixel (shown under the Mux Connections column) fills the output buffer 131 with "4" pixels. On line 136, four pixels are transferred to again fill the output buffer 131. On line 137, three input pixels are transferred to output pixels 0, 1, and 2 which leaves output pixel 3 available for a next set of transfers. Since this condition of filled output pixels in the output buffer 131 is exactly the same as it was prior to the start of transfers in line 135, the offset doesn't change, and the Control Code indicates a "0" representing no change is to be made in the Offset. In other words, where the total number of transfers for a 4-pixel word is a multiple of 4, then the offset will not change for subsequent transfers of a next sequential 4-pixel word. In lines 135–137, the total number of transfers shown in the Mux Connections columns equals 8 pixel transfers. This number of pixel transfers being a multiple of 4 results in the Offset of 3 remaining the same and a "0" in the Control Code column in line 137. In lines 138–140 of FIG. 12, there is shown a total number of 9 pixel transfers shown in the Mux Connections columns to complete the transfers of the 4-pixel word during cycles 0–2. As a result, a "1" in the Control Code on line 140 indicates that the Offset Code to be used for transferring pixels in the next 4-pixel word should be increased by "1" from the current 3 offset to a new 0 Offset.

A "1" in the "O/V" (overflow) column indicates that more pixel transfers are necessary to complete the 4-pixel transfers after the transfers shown in the Mux Connections columns on that line are completed. A "0" in the "O/V" column indicates that the transfers necessary to complete the 4-pixel transfers are complete after the transfers shown in the Mux Connections columns on that line are completed. The remaining rightmost "Active Line" column include a "1" when a cycle includes at least one pixel transfer, and a "0" when a cycle does not include at least one pixel transfer. It must be understood that the Multiplexer Drive ROM 102 only stores the ROM Codes shown in the leftmost three columns of the spreadsheet, and uses the concurrently received four "Input Codes" to look into the spreadsheet and determine which 16-bit ROM Code to transmit to the Pixel Multiplexer 108 via bus 120 during each cycle. The Pixel Multiplexer 108 uses the 16-bit ROM Code provided during each cycle to effect the indicated pixel transfers. It is to be understood that the spreadsheet includes lines which cover each of the possible conditions for the four Input Code columns.

Returning now to FIG. 7, the Cycle Control 3-Bit Counter 104 receives the clock signal at input terminal C and generates the 3-bit "Cycle" code shown in the spreadsheet for transmission to the Multiplexer Drive ROM 102 via bus 117. The Multiplexer Drive ROM 102 transmits a "Hold" signal back to the Cycle Control 3-Bit Counter 104 via conductor 118. The "Hold" signal is the code shown under the O/V column in the spreadsheet. A "1" in the O/V column generates the "Hold" signal and indicates that the input pixels stored in the input buffer 130 are to be held because at least one more cycle is required to complete the transfers of the current 4-pixel word. The "Hold" signal allows a cycle counter in the Cycle Control 3-Bit Counter 104 to continue running, and stops the Pixel Select ROM 100 from providing a new fractional magnification value to the Multiplexer Drive ROM 102 via bus 113. This maintains the fractional magnification value until all of the transfers for a 4-pixel word are complete during the necessary cycles for a particular magnification value.

The magnification processing has been described above in the horizontal or X direction only. It is to be understood that magnification factors in the X and Y (vertical) directions can be set independently. The processing of magnification factors in the vertical (Y) direction is more straight forward than the processing of magnification factors in the horizontal (X) direction. The processing of magnification factors in the vertical direction are performed in the Memory Controller and Sprite State Machine 42 shown in FIG. 2.

Figure 13:
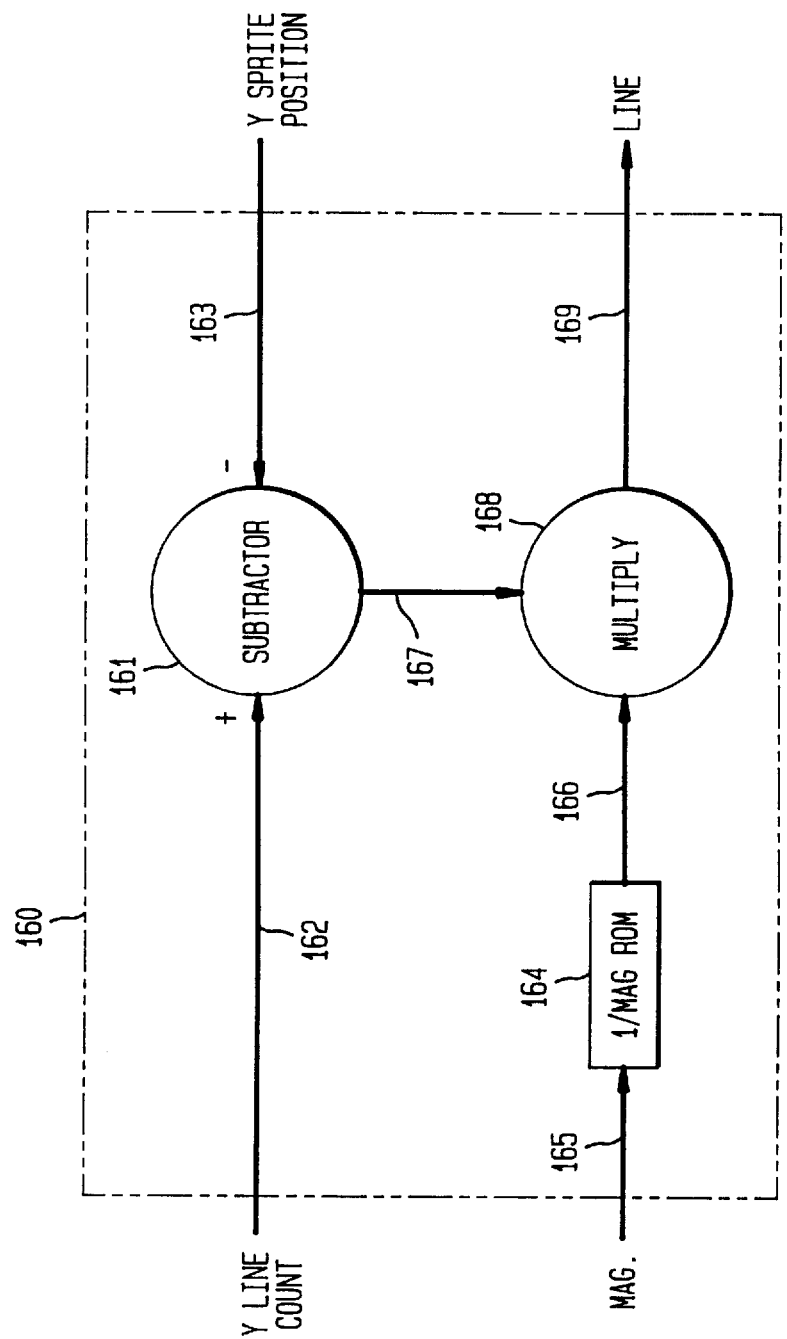
FIG. 13 shows a block diagram of a vertical logic circuit for processing magnification factors in a vertical direction in accordance with the present invention.

Referring now to FIG. 13, there is shown a block diagram of a vertical logic circuit 160 (shown within a dashed line rectangle) for processing magnification factors in a vertical direction in accordance with the present invention. Vertical logic circuit 160 is also referred to as a first magnification modifying means. The vertical logic circuit 160 comprises a subtractor 161, a 1/Magnification Read Only Memory (1/MAG ROM) 164 (also referred to as a magnification inverting means), and a Multiply circuit (MULTIPLY) 168 (also referred to as a multiplying means). The Subtractor 161 receives a Y Line Count signal via a bus 162 indicating which one of the 525 horizontal lines in a standard NTSC video picture is currently being accessed for display on a television receiver. The Y Line Count signal is obtained from a line counter (not shown) in the Memory Controller and Sprite State Machine 42. The Subtractor 161 also receives a Y Sprite Position signal via a bus 163 which is originally obtained from the Sprite Controls in a particular Sprite Entry stored in the Graphics Memory 38 shown in FIG. 2. The Y Sprite Position signal indicates the start line number of a Sprite (Graphic) being processed. The Subtractor 161 subtracts a Y Sprite Position code from the value of the currently received Y Line Count signal to generate a resultant Sprite Line count output signal that is transmitted on a bus 167 to the Multiply circuit 168. The 1/Magnification ROM 164 is encoded as a 1/magnification factor and is used to generate an output signal via a bus 166 that indicates how many lines are to be skipped or repeated. More particularly, the 1/Magnification ROM 164 receives a current magnification factor (MAG.) to be used via a bus 165, and converts this received magnification factor into an inverse thereof (1/MAG.) for transmission via the bus 166 to the Multiply circuit 168. In this manner, the logic of the Multiply circuit 168 actually divides the Sprite Line count output signal received via the bus 167 by the magnification factor received by the 1/Magnification ROM 164 via bus 165. For example, a magnification of one half received on the bus 165 is translated by the 1/Magnification ROM 164 into an output magnification signal of 2.0 that is transmitted on the bus 166 to the Multiply circuit 168. Concurrently, if the Y line Count is at a value of, for example, 110 and the Y Sprite Start Position signal indicates a start line for the sprite of, for example, 110, then the Sprite Line transmitted by the Subtractor 161 via bus 167 has a value of 0. The Multiply circuit 168 then multiplies the number 0 of the Sprite line received via the bus 167 by the magnification of 2.0 received via bus the 166 to produce an output Sprite Line address signal via bus 169 of 0. In a next period of time, the Y line Count is at a value of 111 and the Y Sprite Start Position signal still indicates a starting line for the Sprite as 110, then the Sprite Line transmitted by the Subtractor 161 via the bus 167 has a value of 1. The Multiply circuit 168 then multiplies the number 1 of the Sprite line received via the bus 167 by the magnification of 2.0 received via the bus 166 to produce an output Sprite Line address signal via bus 169 of 2. Therefore, as the Y Line Count on the bus 167 increases by one during each subsequent period, the output Sprite Line address signal via bus 169 increases by 2. Such output Sprite Line Address signal on bus 169 causes the use of every second (even numbered) lines of a Sprite and the skipping of the odd numbered lines of the Sprite to produce a one half image Sprite size. Similarly, a magnification of 2 received on the bus 165 is translated by the 1/Magnification ROM 164 into an output magnification signal of 0.5 that is transmitted on the bus 166 to the Multiply circuit 168. Therefore, for the exemplary condition of the Multiply circuit 168 receiving sequential Sprite Line values of 0 and then 1 from the Subtractor 161 via the bus 167, and a magnification of 0.5 via the bus 166 from the 1/Magnification ROM 164, the resultant multiplications in the Multiply circuit 168 generates output Sprite Line address signals having values of 0 and then 0.5 on bus 169. It is to be understood that the Multiply Circuit 168 only outputs the integer portion of a resultant multiplication, which for the resultant multiplication value of 0.5 above results in a Sprite Line address signal with a value of 0. Similarly, for Sprite Lines having successive values of 2 and 3 received from the Subtractor 161 via the bus 167, and a magnification of 0.5 via the bus 166, from the 1/Magnification ROM 164, the two sequential Sprite Line address signals outputted by the Multiply circuit 168 via bus 169 during sequential cycles will each have a value of 1. Therefore, for a magnification of 2.0 received by the 1/Magnification ROM 164 via the bus 165, the output Sprite Line address signal outputted by the Multiply circuit 168 via bus 169 is always used twice.

Figure 14:
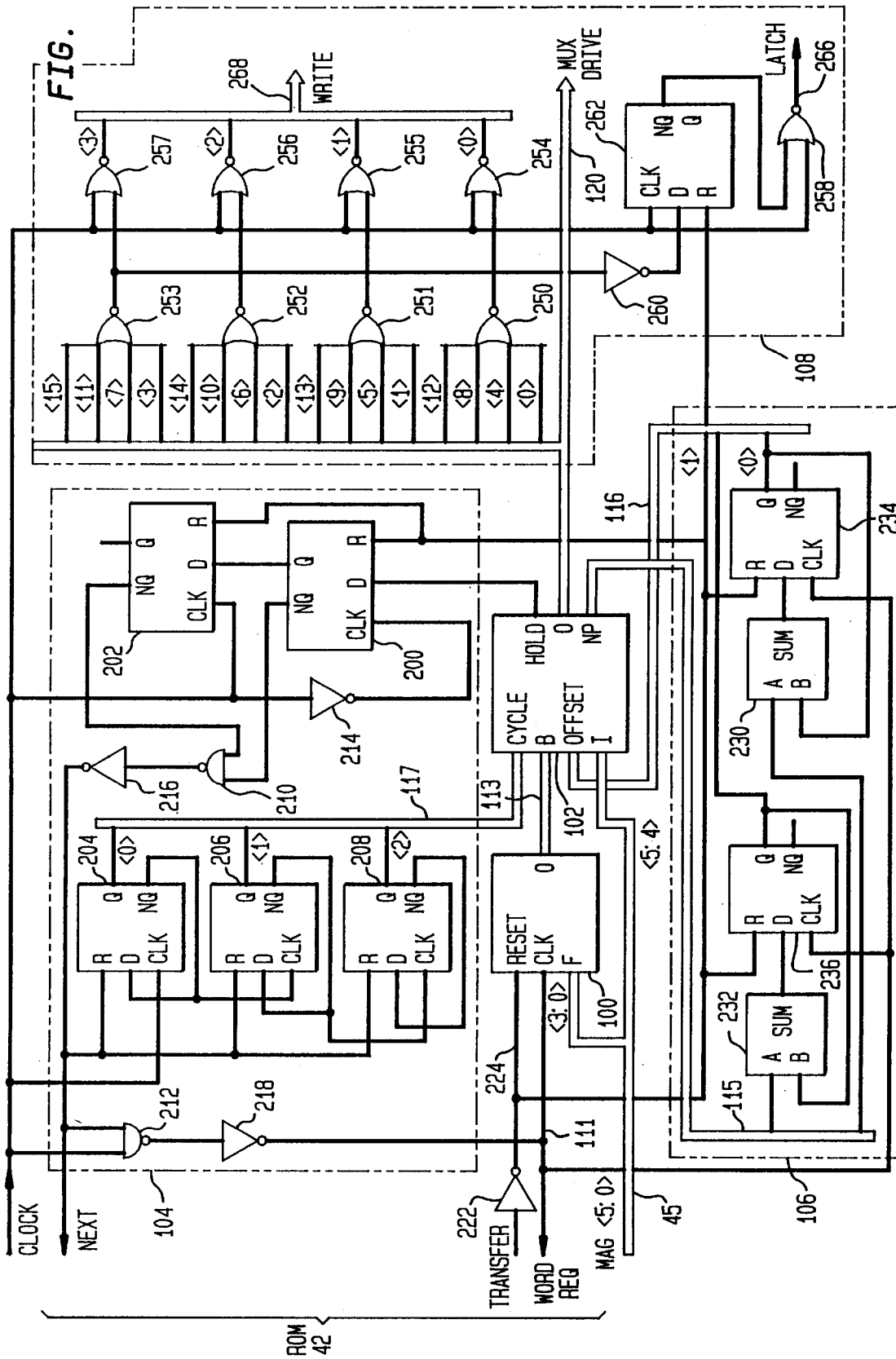
FIG. 14 shows a circuit diagram for a first portion of a Pixel Buffer Data Pipe and Magnification Circuit shown in FIG. 7 in accordance with the present invention.

Referring now to FIG. 14, there is shown a circuit diagram for implementing a first portion of a Pixel Buffer Data Pipe and Magnification Circuit 98 shown in FIG. 7 in accordance with the present invention. More particularly, FIG. 14 shows a Pixel Select Read Only Memory (ROM) 100, a Multiplexer Drive ROM 102, a Cycle Control 3-Bit Counter 104 (shown within a dashed line rectangle), an Offset Control 2-Bit Adder 106 (shown within a dashed line rectangle), a first portion of a Pixel Multiplexer 108 (shown within a dashed line area), and an inverter 222.

The Cycle Control 3-Bit Counter 104 comprises first, second third, four, and fifth D-type flip-flops designated 200, 202, 204, 206, and 208, respectively, first and second 2-input NAND gates designated 210 and 212, respectively, and first, second, and third inverters designated 214, 216, and 218, respectively. The externally generated clock signal on the conductor 110 is coupled to an input of the inverter 214 whose output is coupled to a CLK input terminal of the flip-flop 200. The flip-flop 202 directly receives the externally generated clock signal via a conductor 110 at a CLK input terminal. The flip-flop 200 receives a "Hold" signal at a D input terminal from a Hold output terminal of the Multiplexer Drive ROM 102. A Q output terminal of the first flip-flop 200 is coupled directly to a D input terminal of the second flip-flop 202. Clock output signals generated at NQ output terminals of the first and second flip-flops 200 and 202 are each connected to a separate one of the inputs of the first NAND gate 210. The output of the first NAND gate 210, which provides a "Next" signal, is coupled to an input of the second inverter 216 whose output is coupled to a first input of the second NAND gate 212 and to the Memory Controller and Sprite State Machine 42. The "Next" signal indicates that a 4-pixel transfer is complete for causing a next 4-pixel word to be inputted into the Pixel Multiplexer 108 (shown in FIG. 7) via a bus 39 for subsequent transfers as shown in FIG. 8–10. The NAND gate 212 receives the Clock signal at a second input thereof from the conductor 110. An output of the NAND gate 212 is coupled to an input of the inverter 218 whose output is coupled to a CLK input of the Pixel Select ROM 100 and the Memory Controller and Sprite State Machine 42 (shown in FIG. 2) so as to generate a next word request (WORD REQ.) signal when the other input of the NAND gate 212 (from inverter 216) is high. The flip-flops 200 and 202 each receive an inverted "TRANSFER" signal from an output of the inverter 222 at an R input thereof for resetting the flip-flops 200 and 202.

Flip-flop 204 receives the Clock signal from the conductor 110 at a CLK input terminal. The output signal from the second inverter 216 is coupled to R input terminals of the flip-flops 204, 206, and 208. Q outputs of the flip-flops 204, 206, and 208 are connected via a bus 117 to a CYCLE input of the Multiplexer Drive ROM 102. Flip-flops 204, 206, and 208 generate bits 0, 1, and 2, respectively, of a 3-bit Cycle code (binary range of 0–7) and transmit the sequentially coded binary cycle output signal from their Q output terminals to a CYCLE input of the Multiplexer Drive ROM via a bus 117. A D terminal of the flip-flop 204 is connected to a NQ terminal of the flip-flop 204 and a CLK terminal of the flip-flop 206. Similarly, a D terminal of the flip-flop 206 is connected to a NQ terminal of the flip-flop 206 and a CLK terminal of the flip-flop 208. A D terminal of the flip-flop 208 is connected to an NQ terminal of the flip-flop 208. The flip-flops 200 and 202, the NAND gates 210 and 212, and the inverters 214, 216, and 218 function to hold a fractional magnification value at the output of the Pixel Select ROM 100 until all transfers of a 32-bit, 4-pixel, word have been completed in the Pixel Multiplexer 108. Still further, the flip-flops 204, 206, and 208 provide the sequential Cycle signals to the Multiplexer Drive ROM 102 for sending the proper ROM Codes (discussed for FIGS. 11 and 12) to the Pixel Multiplexer 108 during each cycle.

The Pixel Select ROM 100 receives a Clock signal from the Cycle Control 3-Bit Adder 104 (specifically from the output of inverter 218) at a CLK input terminal via the bus 111, and a Reset (TRANSFER) signal at a RESET input terminal via an inverter 222 and a conductor 224. Still further, the Pixel Select ROM 100 receives a 4-bit fractional magnification signal from the Memory Controller and Sprite State Machine at an F input terminal via a bus 45. A 4-bit output signal from an output terminal (0) of the Pixel Select ROM 100 is transmitted to a B input terminal of the Multiplexer Drive ROM 102 via a bus 113.

The Offset Control 2-Bit Adder 106 comprises first and second Adders 230 and 232, and first and second D-type flip-flops 234 and 236. The Adders 230 and 232 receive bits 0 and 1, respectively, of a 2-bit "No Pixel" signal at first input terminals (A) that is transmitted from an NP output terminal of the Multiplexer Drive ROM 102 via a bus 115. Individual output terminals (SUM) of the Adders 230 and 232 are coupled to D input terminals of the flip-flops 234 and 236, respectively. Output signals at the output terminals (Q) of the flip-flops 234 and 236 represent a 0 bit and a 1 bit, respectively, of a 2-bit Offset signal that is transmitted to an OFFSET input terminal of the Multiplexer Drive ROM 102 via a bus 116. Still further, the 1-bit output signals of the first and second flip-flops 234 and 236 are also fed back to a second input terminal (B) of the first and second Adders 230 and 232, respectively. CLK inputs of the flip-flops 234 and 236 are coupled to bus 111 which is coupled to the output of the inverter 218. The Reset (TRANSFER) signal on the conductor 224 is provided to reset (R) input terminals of each of the flip-flops 234 and 236. In operation, the first and second Adders 230 and 232 receive bits 0 and 1, respectively, of the 2-bit "No. Pixel" code via the bus 115, and in combination with the flip-flops 234 and 236 generate bits 0 and 1, respectively, of the 2-bit Offset signal. The Offset Control 2-Bit Adder 106 then transmits the 2-bit Offset code shown (shown in the Offset Input Code column of the spreadsheet of FIGS. 11 and 12) back to the Multiplexer Drive ROM 102 via the bus 116.

The Multiplexer Drive ROM 102 receives the 3-bit cycle signal from the Cycle Control 3-Bit Counter at a CYCLE input terminal via the bus 117, the 4-bit output signal at the B input terminal from the Pixel Select ROM 100 via the bus 113, the 2-bit Offset signal at the OFFSET input terminal from the Offset Control 2-Bit Adder 106 via the bus 116, and a 2-bit Integer Magnification signal (MAG <5:4>) at an I input terminal from the Memory Controller and Sprite State Machine 42 via the bus 45. The Multiplexer Drive ROM 102 transmits from a O output a 16-bit ROM Code word to the Pixel Multiplexer 108 via a bus 120 as was described hereinbefore for the spreadsheet of FIGS. 11, and 12.

A first portion (shown within a dashed line rectangle) of the Pixel Multiplexer 108 comprises first, second, third, fourth, fifth, sixth, seventh, eighth, and ninth NOR gates designated 250, 251, 252, 253, 254, 255, 256, 257, and 258, respectively, an inverter 260, and a D-Type flip-flop 262. The NOR gate 250 receives bits 0, 4, 8, and 12 of the 16-bit ROM Code word received on the bus 120 at separate inputs, the NOR gate 251 receives bits 1, 5, 9, and 13 of the 16-bit ROM Code word at separate inputs, the NOR gate 252 receives bits 2, 6, 10, and 15 of the 16-bit ROM Code word at separate inputs, and the NOR gate 253 receives bits 3, 7, 11, and 15 of the 16-bit ROM Code word at separate inputs. Output signals from the NOR gates 250, 251, 252, and 253 are received at a second input terminal (B) of the NOR gates 254, 255, 256, and 257, respectively. The output of the NOR gate 253 is also coupled via a conductor 264 to an input of the inverter 260 whose output is coupled to a D input terminal of the flip-flop 262. The clock signal on the conductor 110 is applied to a first input terminal (A) of each of the NOR gates 254, 255, 256, and 257. Single bits numbered 0, 1, 2, and 3 are outputted from the NOR gates 254, 255, 256, and 257, respectively, and combined into a 4-bit WRITE timing signal that is transmitted over a bus 268. The clock signal propagating on the conductor 110 is coupled to a CLK input terminal of the flip-flop 262, and to a B input of the ninth NOR gate 258. The transfer/reset signal propagating on the conductor 224 is coupled to an R input terminal of the flip-flop 262, and the output signal from an NQ output terminal of the flip-flop 262 is coupled to an A input terminal of the NOR gate 258. The NOR gate 258 generates a LATCH output signal that is sent on a conductor 266.

Figure 15:
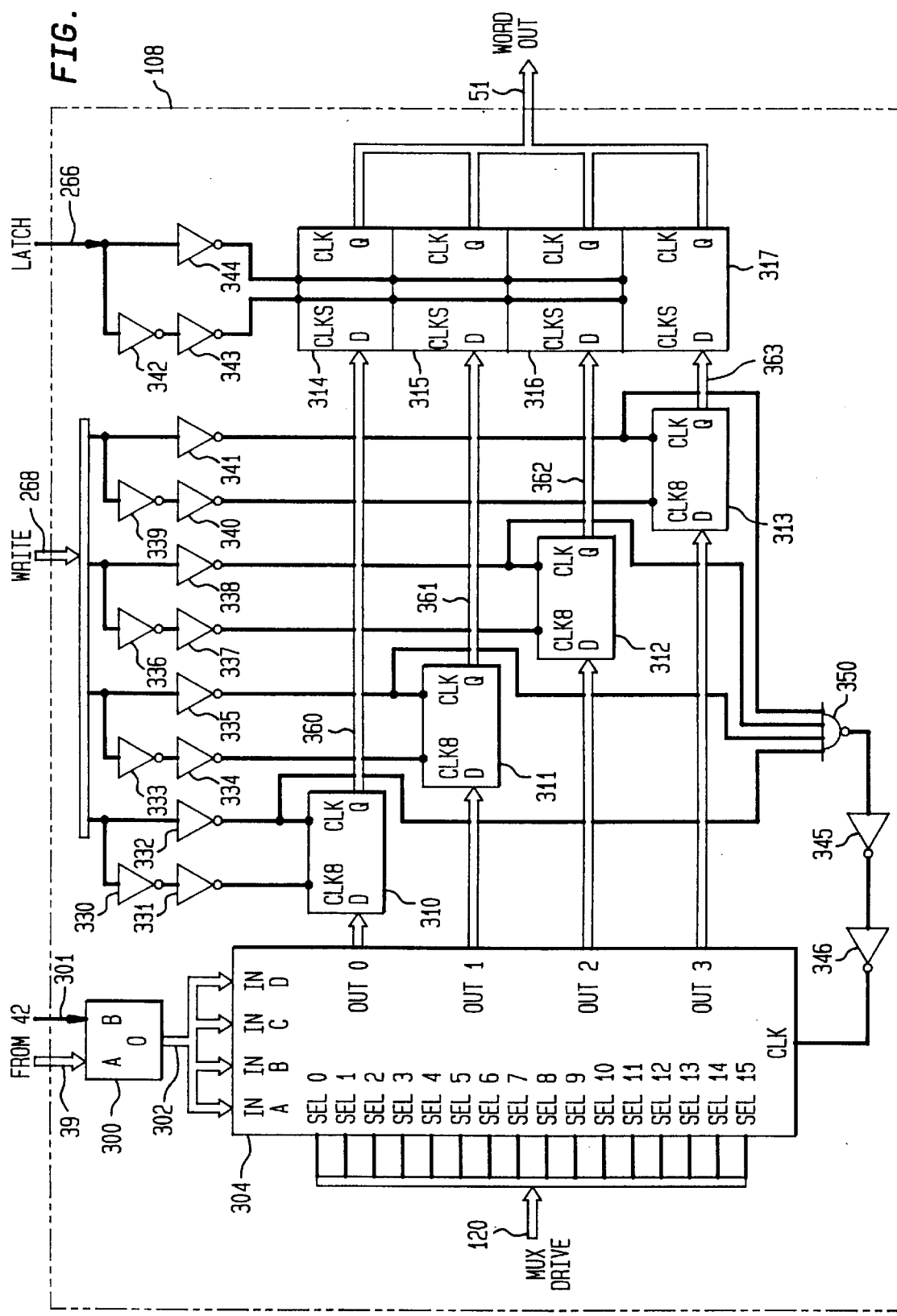
FIG. 15 shows a circuit diagram for a second portion of a Pixel Buffer Data Pipe and Magnification Circuit shown in FIG. 7 in accordance with the present invention.

Referring now to FIG. 15, there is shown a circuit diagram for a second portion (shown within a dashed line rectangle) of the Pixel Buffer Data Pipe and Magnification Circuit 108 shown in FIG. 7 in accordance with the present invention. The second portion of the Pixel Buffer Data Pipe and Magnification Circuit 108 comprises a Quad Octal Latch 300, a Quad Octal Multiplexer 304, first, second, third, fourth, fifth, sixth, seventh, and eighth Octal Delays designated 310, 311, 312, 313, 314, 315, 316, and 317, respectively, seventeen inverters designated 330–346, and a 4-input NAND gate 350. The Quad Octal Latch 300 receives a 32-bit word (for four 8-bit pixels) at an first input (A) from the Memory Controller and Sprite State Machine 42 via a bus 39, and a Word Latch signal on a conductor 301 at an input B to capture the 32-bit word. The Quad Octal Latch 300 outputs at an output O, the captured 32-bit word so that the 8-bits for each of pixels 0, 1, 2, and 3 of the 32-bit word are inputted to A, B, C, and D inputs, respectively, of the Quad Octal Multiplexer 304 via a bus 302. Sixteen bits (bits 0–15) of a Multiplexer Drive (MUX DRIVE) signal are received at separate inputs (SEL 0–15) of the Octal Multiplexer 304 from the Multiplexer Drive ROM 102 (shown in FIGS. 7 and 14) via bus 120. The 16-bit MUX DRIVE signal represents a 16-bit ROM Code as is found in the spreadsheet of FIGS. 11 and 12 for a particular set of input parameters (Magnification, Offset, and Cycle) presented to the Multiplexer Drive ROM 102. Within the Quad Octal Multiplexer 304, the four 8-bit pixels received at the inputs A, B, C, and D via the bus 302 are transferred to the proper outputs 0, 1, 2, and 3 in accordance with the ROM Code received in the MUX DRIVE signal via bus 120. The pixel signals outputted at outputs 0, 1, 2, and 3 of the Quad Octal Multiplexer 304 are latched into D inputs of the Octal delays 310, 311, 312, and 313, respectively.

Bits 0, 1, 2, and 3 of a 4-bit WRITE timing signal transmitted by the NOR gates 254, 255, 256, and 257, respectively, of FIG. 14 via bus 268 are received at input of respective inverters 330 and 332, inverters 333 and 335, inverters 336 and 338, and inverters 339 and 341. More particularly, bit 0 of the WRITE timing signal is received at an input of the inverters 330 and 332. The output from the inverter 330 is coupled to an input of the inverter 331 whose output is coupled to a CLKB input of the first Octal Delay 310. An output of the inverter 332 is coupled to a CLK input of the first Octal Delay 310. Bit 1 of the WRITE timing signal is received at an input of the inverters 333 and 335. The output from the inverter 333 is coupled an input of the inverter 334 whose output is coupled to a CLKB input of the second Octal Delay 311. An output of the inverter 335 is coupled to a CLK input of the second Octal Delay 311. Bit 2 of the WRITE timing signal is received at an input of the inverters 336 and 338. The output from the inverter 336 is coupled to an input of the inverter 337 whose output is coupled to a CLKB input of the third Octal Delay 312. An output of the inverter 338 is coupled to a CLK input of the third Octal Delay 312. Bit 3 of the WRITE timing signal is received at an input of the inverters 339 and 341. The output from the inverter 339 is coupled to an input of the inverter 340 whose output is coupled to a CLKB input of the fourth Octal Delay 313. An output of the inverter 341 is coupled to a CLK input of the fourth Octal Delay 313. The CLK inputs of the Octal Delays 310–313 are coupled to separate inputs of the NAND gate 350, and the output from the NAND gate 350 is coupled to an input of the inverter 345 whose output is coupled to an input of the inverter 346. An output of the inverter 346 is coupled to a CLK input of the Octal Multiplexer 304.

The output from Octal Delays 310, 311, 312, and 313 are coupled to a D input terminal of Octal Delays 314, 315, 316, and 317, respectively, via respective buses 360, 361, 362, and 363. The Latch signal generated at the output of the NOR gate 258 in FIG. 14 is received at an input of each of the inverters 342 and 344. An output from the inverter 342 is coupled to an input of the inverter 343 whose output is coupled to a CLKB input of each of the Octal Delays 314, 315, 316, and 317. An output of the inverter 344 is coupled to a CLK input of the each of the Octal Delays 314, 315, 316, and 317. Q outputs of the Octal Delays 314, 315, 316, and 317 are coupled to a bus 51 to provide a WORD OUT signal.

In operation, a 32-bit word comprising first, second, third, and fourth 8-bit pixels is received at inputs A, B, C, and D, respectively, of the Octal Multiplexer 304 via the bus 302. The first, second, third, and fourth 8-bit pixels are transferred (multiplexed) to selected outputs 0, 1, 2, and 3 of the Octal Multiplexer 304 in accordance with the ROM Code received in the MUX DRIVE signal via bus 120, and then latched into the Octal Delays 310, 311, 312, and 313, respectively, by timing signals received via the bus 268. The pixel temporarily stored in the Octal Delays 310, 311, 312, and 313 are relatched into the Octal Delays 314, 315, 316, and 317, respectively, upon the reception of a LATCH signal on conductor 266. The 8-bit pixel word output from each of the Octal Delays 314, 315, 316, and 317 is formed into a 32-bit output word (WORD OUT) which is transmitted to a Pixel Assembly Buffer 52 (shown in FIG. 7) via a bus 51.

Figure 16:
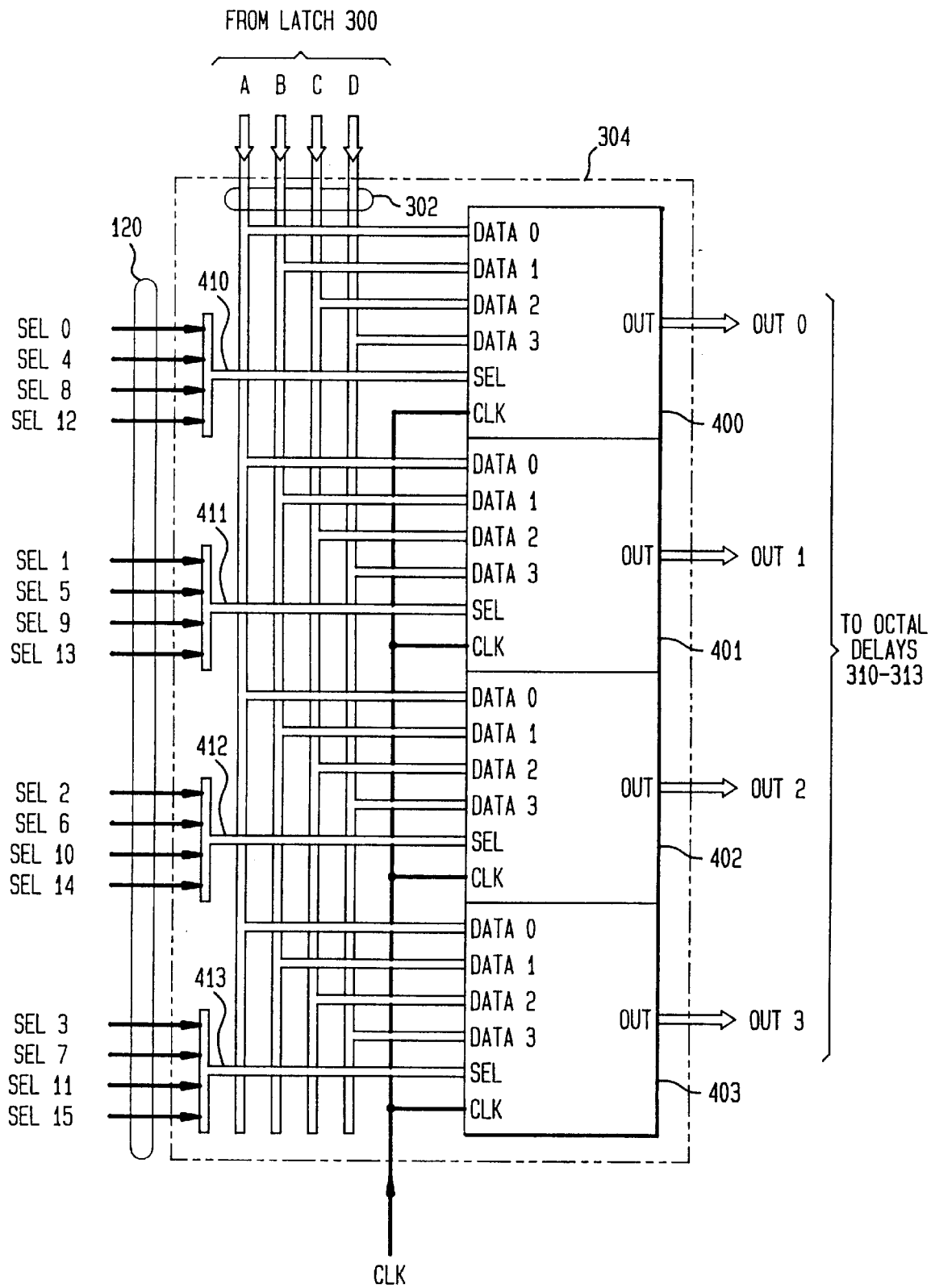
FIG. 16 shows a block diagram of a Quad octal multiplexer used within a Pixel Multiplexer included in a Pixel Buffer Data Pipe and Magnification Circuit shown in FIG. 7 in accordance with the present invention.

Referring now to FIG. 16, there is shown a block diagram of a Quad Octal Multiplexer 304 (shown within a dashed line rectangle) used within a Pixel Multiplexer 108 shown in FIGS. 7 and 15 in accordance with the present invention. The Quad Octal Multiplexer 304 comprises first, second, third, and fourth Octal Dynamic Multiplexers designated 400, 401, 402, and 403, respectively. Data for pixels 0, 1, 2, and 3 of a 4-pixel word are received from the Quad Octal Latch 300 (shown only in FIG. 15) via a bus 302 at inputs A, B, C, and D, respectively, of the Octal Multiplexer 304. The inputs A, B, C, and D are coupled to DATA 0, DATA 1, DATA 2, and DATA 3 inputs, respectively, of each of the first, second, third, and fourth Octal Dynamic Multiplexers 400, 401, 402, and 403. Select 0 (SEL 0), SEL 4, SEL 8, and SEL 12 bits of a 16-bit ROM Code received from a Multiplexer Drive ROM 102 (shown in FIGS. 7 and 14) via a Bus 120 are coupled to a SEL input terminal of the first Octal Dynamic Multiplexer 400 via a bus section 410. Select 1 (SEL 1), SEL 5, SEL 9, and SEL 13 bits of the 16-bit ROM Code word received from a Multiplexer Drive ROM 102 via a Bus 120 are coupled to a SEL input terminal of the second Octal Dynamic Multiplexer 401 via a bus section 411. Select 2 (SEL 2), SEL 6, SEL 10, and SEL 14 bits of the 16-bit ROM Code word received from a Multiplexer Drive ROM 102 via a Bus 120 are coupled to a SEL input terminal of the third Octal Dynamic Multiplexer 402 via a bus section 412. Select 3 (SEL 3), SEL 7, SEL 11, and SEL 15 bits of the 16-bit ROM Code word received from a Multiplexer Drive ROM 102 via a Bus 120 are coupled to a SEL input terminal of the fourth Octal Dynamic Multiplexer 403 via a bus section 413. Each of the first, second, third, and fourth Octal Dynamic Multiplexers 400, 401, 402, and 403 also receive an externally generated Clock signal at a CLK input terminal. An output terminal of the first, second, third, and fourth Octal Dynamic Multiplexers 400, 401, 402, and 403 transmits an 8-bit pixel OUT 0, OUT 1, OUT 2, and OUT 3 signal, respectively, to respective Octal Delays 310, 311, 312, and 313 (shown in FIG. 15).

In operation, each of the first, second, third, and fourth Octal Dynamic Multiplexers 400, 401, 402, and 403 receive data for four pixels of a data word at inputs A, B, C, and D via the bus 302, and four different designated bits of a 16 bit ROM Code via bus 120. The 16-bit ROM Code is derived from the spreadsheet shown in FIGS. 11 and 12. The first Octal Dynamic Multiplexer 400 multiplexes the 8-bits of data for one or none of the received four pixels received via bus 302 to its output (OUT) terminal in response to a binary 1 existing in one of the 0, 4, 8, and 12 bits of the ROM Code received via the bus 120. The second Octal Dynamic Multiplexer 401 multiplexes the 8-bits of data for one or none of the received four pixels received via bus 302 to its output (OUT) terminal in response to a binary 1 existing in one of the 1, 5, 9, and 13 bits of the ROM Code received via the bus 120. The third Octal Dynamic Multiplexer 402 multiplexes the 8-bits of data for one or none of the received four pixels received via the bus 302 to its output (OUT) terminal in response to a binary 1 existing in one of the 2, 6, 10, and 14 bits of the ROM Code received via the bus 120. The fourth Octal Dynamic Multiplexer 402 multiplexes the 8-bits of data for one or none of the received four pixels received via the bus 302 to its output (OUT) terminal in response to a binary 1 existing in one of the 3, 7, 11, and 15 bits of the ROM Code received via the bus 120. More particularly, the first, second, third, and fourth Octal Dynamic Multiplexers 400, 401, 402, and 403 function to transfer (multiplex) incoming pixels 0, 1, 2, and 3 to outgoing pixels 0, 1, 2, and 3 during each cycle as was described hereinbefore for FIGS. 8, 9 and 10 using the ROM Code as was described hereinbefore for the spreadsheet shown in FIGS. 11 and 12.

It is to be appreciated and understood that the specific embodiments of the invention described hereinbefore are merely illustrative of the general principles of the invention. Various modifications may be made by those skilled in the art which are consistent with the principles set forth. For example, although the present invention has been described hereinabove for use in a subscriber cable box unit 10, it is to be understood that the present invention can be used at, for example, a production editing station prior to the television signal being broadcast. In other words, the present invention can be used in television productions for creating initial products prior to their being broadcast rather than manipulating the television signal afterwards at a remote subscriber's location. This is possible because the quality and the resolution of the picture will be the same regardless of whether the editing is performed during production or thereafter at the subscriber's location. Therefore, it does not matter if the quality or resolution might be better in a non-edited television production if the editing is performed somewhere prior to the production being seen on the subscriber's interlaced television set.

What is claimed is:

1. Apparatus for modifying the magnification of a graphic prior to displaying the graphic image on a television receiver comprising:

first magnification modifying means for modifying the magnification of a graphic by a first independent predetermined magnification factor in a vertical direction by generating graphic line address output signals for selectively preventing a transmission of predetermined horizontal lines of the graphic upon the reception of a vertical magnification factor that is less than unity, and for selectively repeating a transmission of predetermined horizontal lines of the graphic upon the reception of a vertical magnification factor that is greater than unity; and second magnification modifying means responsive to the transmissions of the horizontal lines of the graphic indicated for transmission by the graphic line address output signals of the first magnification modifying means for modifying the magnification of the graphic in a horizontal direction by a second independent predetermined horizontal magnification factor, the second magnification modifying means selecting N predetermined pixels of each received group of X pixels that are multiplexed into a transmitting group of X pixels for transmission in each output signal of the apparatus for a horizontal magnification factor equal to or less than unity, where $N \leq X$, and for repeating pixels of each received group of X pixels by a predetermined integer amount corresponding to a horizontal integer magnification factor that is greater than unity for transmission in each output signal of the apparatus.

2. The apparatus of claim 1 wherein the first magnification modifying means comprises:

magnification inverting means for inverting the value of the received first independent vertical magnification factor and generating an output signal representative of the inverted vertical magnification factor; and multiplying means responsive to the output signal from the magnification inverting means and an input signal representing a number of a horizontal line of the graphic currently being accessed for multiplying the inverted vertical magnification factor by the number of the horizontal line of the graphic to generate an output signal representing a line number of the graphic to be used in a vertical magnification process.

3. The apparatus of claim 2 wherein the first magnification modifying means further comprises a subtractor for subtracting a starting horizontal line number of a graphic being accessed from a current line number being accessed of a display of the television receiver and generating an output signal to the multiplying means representing the number of a horizontal line of a graphic being currently pointed to.

4. The apparatus of claim 1 wherein the second magnification modifying means comprises:

a pixel select Read-Only-Memory (ROM) responsive to a received horizontal fractional magnification value for generating a horizontal fractional magnification output signal indicating which pixels of a group of X pixels are to be used in generating an output signal of the apparatus;

a multiplexer drive ROM responsive to the horizontal fractional magnification output signal and a received integer horizontal magnification value for generating separate coded output signals during sequential multiplexing cycles indicating which received pixels of an incoming group of a plurality of Y pixels are to be multiplexed into which output pixels of an outgoing group of a plurality of Y pixels; and pixel multiplexing means responsive to the coded output signals from the multiplexer drive ROM and a reception of the incoming group of the plurality of Y pixels for multiplexing predetermined ones of the plurality of Y pixels of the incoming group into predetermined ones of the plurality of Y pixels of the outgoing group during each predetermined cycle to form an apparatus output signal.

5. The apparatus of claim 4 further comprising:

cycle control means responsive to a clock signal for generating a predetermined number of sequential cycle signals for transmission to the multiplexer drive ROM; and offset control means responsive to a completion of a multiplexing of an incoming group of a plurality of Y pixels into predetermined ones of an outgoing group of a plurality of Y pixels during at least one cycle for generating an offset control signal to the multiplexer drive ROM for skewing the multiplexing of a next incoming group of a plurality of Y pixels to begin filling pixels of the outgoing group of Y pixels when a completed multiplexing of a prior incoming group of Y pixels did not fill all of the pixels of the outgoing group of Y pixels during a last cycle; and the multiplexer drive ROM is responsive to each cycle signal and the offset control signal for generating a separate predetermined coded output signal to the pixel multiplexing means.

6. The apparatus of claim 4 wherein the multiplexer drive ROM is responsive to a combination of the horizontal fractional magnification output signal from the pixel select ROM and the received horizontal integer magnification value indicating a horizontal magnification of less than unity for generating coded output signals that cause predetermined ones of the pixels in the incoming group of the plurality of Y pixels to be repeatedly multiplexed the amount of times indicated by the horizontal integer magnification value into sequential pixels in the outgoing group of the plurality of Y pixels in the pixel multiplexer, and the multiplexer drive ROM is responsive to a combination of the horizontal fractional magnification output signal from the pixel select ROM and the received horizontal integer magnification value indicates a horizontal magnification greater than unity for generating coded output signals that cause all of the pixels in the incoming group of the plurality of Y pixels to be multiplexed more than once into sequential pixels in the outgoing group of the plurality of Y pixels in the pixel multiplexer, and other predetermined ones of the pixels in the incoming group of the plurality of Y pixels to be multiplexed only once into sequential pixels in the outgoing group of the plurality of Y pixels in the pixel multiplexer as indicated by the horizontal fractional magnification output signal.

7. The apparatus of claim 4 wherein the multiplexer drive ROM further generates a hold control signal for preventing the pixel select ROM from changing the currently provided coded output signals and the reception of a next incoming group of the plurality of Y pixels before a multiplexing of a current incoming group of the plurality of Y pixels is complete.

8. Apparatus for modifying the magnification of a graphic prior to displaying the graphic on a television receiver comprising vertical magnification modifying means comprising:

magnification inverting means for inverting the value of a received vertical magnification factor and generating an output signal representative of the inverted vertical magnification factor, where the vertical magnification factor can comprise fractional and integer values;

multiplying means responsive to the output signal from the magnification inverting means and an input signal representing a number of a horizontal line of the graphic currently being accessed for multiplying the inverted magnification factor with the number of the horizontal line to generate an output signal representing a line number of the graphic to be accessed; and, a subtraactor for subtracting a starting horizontal line number of a graphic being accessed from a current line number of a display of the television receiver being accessed and generating an output signal to the multiplying means representing the number of a horizontal line of a graphic being currently pointed to.

9. The apparatus of claim 8 wherein the apparatus further comprises horizontal magnification modifying means comprising:

a pixel select Read-Only-Memory (ROM) responsive to a received horizontal fractional magnification value for generating a horizontal fractional magnification output signal indicating which pixels of a group of a plurality of X pixels are to be used in generating an output signal of the apparatus;

a multiplexer drive ROM responsive to the horizontal fractional magnification output signal and a received integer magnification value for generating separate coded output signals during sequential multiplexing cycles indicating which received pixels of an incoming group of a plurality of Y pixels are to be multiplexed into which output pixels of an outgoing group of a plurality of Y pixels; and pixel multiplexing means responsive to the coded output signals from the multiplexer drive ROM and a reception of the incoming group of the plurality of Y pixels for multiplexing predetermined ones of the plurality of Y pixels of the incoming group into predetermined ones of the Y pixels of the outgoing group during each predetermined cycle to form an apparatus output signal.

10. The apparatus of claim 9 further comprising:

cycle control means responsive to a clock signal for generating a predetermined number of sequential cycle signals for transmission to the multiplexer drive ROM; and offset control means responsive to a completion of a multiplexing of an incoming group of a plurality of Y pixels into predetermined ones of an outgoing group of a plurality of Y pixels during at least one cycle for generating an offset control signal to the multiplexer drive ROM for skewing the multiplexing of a next incoming group of a plurality of Y pixels to begin filling pixels of the outgoing group of the plurality of Y pixels when a completed multiplexing of a prior incoming group of a plurality of Y pixels did not fill all of the outgoing pixels of the outgoing group of the plurality of Y pixels during a last cycle; and the multiplexer drive ROM is responsive to each cycle signal and the offset control signal for generating a separate predetermined coded output signal to the pixel multiplexing means.

11. The apparatus of claim 9 wherein the multiplexer drive ROM is responsive to a combination of the horizontal fractional magnification output signal from the pixel select ROM and the received horizontal integer magnification value indicating a magnification of less than unity for generating coded output signals that cause predetermined ones of the pixels in the incoming group of the plurality of Y pixels to be multiplexed only once into sequential pixels in the outgoing group of the plurality of Y pixels in the pixel multiplexer, and the multiplexer drive ROM is responsive to a combination of the horizontal fractional magnification output signal from the pixel select ROM and the received horizontal integer magnification value indicating a magnification greater than unity for generating coded output signals that cause all of the pixels in the incoming group of the plurality of Y pixels to be repeatedly multiplexed the amount of times indicated by the horizontal integer magnification value into sequential pixels in the outgoing group of the plurality of Y pixels in the pixel multiplexer, and other predetermined ones of the pixels in the incoming group of the plurality of Y pixels to be multiplexed only once into sequential pixels in the outgoing group of the plurality of Y pixels in the pixel multiplexer as indicated by the horizontal fractional magnification output signal.

12. The apparatus of claim 9 wherein the multiplexer drive ROM further generates a hold control signal for preventing the pixel select ROM from changing the currently provided coded output signals and the reception of a next incoming group of the plurality of Y pixels before a multiplexing of a current incoming group of the plurality of Y pixels is complete.

13. Apparatus for modifying the magnification of a graphic prior to displaying an image of the graphic on a television receiver comprising a horizontal magnification modifying means comprising:

a pixel select Read-Only-Memory (ROM) responsive to a received horizontal fractional magnification value for generating a horizontal fractional magnification output signal indicating which pixels of an incoming group of a plurality of X pixels are to be used in generating an output signal of the apparatus;

a multiplexer drive ROM responsive to the horizontal fractional magnification output signal and a received horizontal integer magnification value for generating separate coded output signals during sequential multiplexing cycles indicating which received pixels of an incoming group of a plurality of Y pixels are to be multiplexed into which output pixels of an outgoing group of a plurality of Y pixels; and pixel multiplexing means responsive to the coded output signals from the multiplexer drive ROM and a reception of the incoming group of the plurality of Y pixels for multiplexing predetermined ones of the plurality of Y pixels of the incoming group into predetermined ones of the plurality of Y pixels of the outgoing group during each predetermined cycle to form an apparatus output signal.

14. The apparatus of claim 13 further comprising:

cycle control means responsive to a clock signal for generating a predetermined number of sequential cycle signals for transmission to the multiplexer drive ROM; and offset control means responsive to a completion of a multiplexing of an incoming group of a plurality of Y pixels into predetermined ones of an outgoing group of a plurality of Y pixels during at least one cycle for generating an offset control signal to the multiplexer drive ROM for skewing the multiplexing of a next incoming group of a plurality of Y pixels to begin filling pixels of the outgoing group of a plurality of Y pixels when a completed multiplexing of a prior incoming group of a plurality of Y pixels did not fill all of the outgoing pixels of the outgoing group of a plurality of Y pixels during a last cycle; and the multiplexer drive ROM is responsive to each cycle signal and the offset control signal for generating a separate predetermined coded output signal to the pixel multiplexing means.

15. The apparatus of claim 13 wherein the multiplexer drive ROM is responsive to a combination of the horizontal fractional magnification output signal from the pixel select ROM and the received horizontal integer magnification value indicating a magnification of less than unity for generating coded output signals that cause predetermined ones of the pixels in the incoming group of the plurality of Y pixels to be multiplexed only once into sequential pixels in the outgoing group of the plurality of Y pixels in the pixel multiplexer, and the multiplexer drive ROM is responsive to a combination of the horizontal fractional magnification output signal from the pixel select ROM and the received horizontal integer magnification value indicating a magnification that is greater than unity for generating coded output signals that cause all of the pixels in the incoming group of the plurality of Y pixels to be repeatedly multiplexed the amount of times indicated by the horizontal integer magnification value into sequential pixels in the outgoing group of the plurality of Y pixels in the pixel multiplexer, and other predetermined ones of the pixels in the incoming group of the plurality of Y pixels to be multiplexed only once into sequential pixels in the outgoing group of the plurality of Y pixels in the pixel multiplexer as indicated by the horizontal fractional magnification output signal.

16. The apparatus of claim 13 wherein the multiplexer drive ROM further generates a hold control signal for preventing the pixel select ROM from changing the currently provided coded output signals and the reception of a next incoming group of the plurality of Y pixels before a multiplexing of a current incoming group of the plurality of Y pixels is complete.

17. The apparatus of claim 13 further comprising vertical magnification modifying means comprising:

magnification inverting means for inverting the value of a received vertical magnification factor and generating an output signal representative of the inverted vertical magnification factor; and multiplying means responsive to the output signal from the magnification inverting means and an input signal representing a number of a horizontal line of the graphic currently being accessed for multiplying the inverted vertical magnification factor with the number of the horizontal line to generate an output signal representing a line number of the graphic to be accessed.

18. The apparatus of claim 17 wherein the first magnification modifying means further comprises a subtractor for subtracting a starting horizontal line number of a graphic being accessed from a current line number of a display of the television receiver being accessed and generating an output signal to the multiplying means representing the number of a horizontal line of a graphic being currently pointed to.

* * * * *